United States Patent
Machida

(10) Patent No.: US 8,615,761 B2
(45) Date of Patent: Dec. 24, 2013

(54) VIRTUAL MACHINE PACKAGE GENERATION SYSTEM, VIRTUAL MACHINE PACKAGE GENERATION METHOD, AND VIRTUAL MACHINE PACKAGE GENERATION PROGRAM

(75) Inventor: Fumio Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 356 days.

(21) Appl. No.: 12/920,768

(22) PCT Filed: Mar. 6, 2009

(86) PCT No.: PCT/JP2009/054342
§ 371 (c)(1),
(2), (4) Date: Sep. 3, 2010

(87) PCT Pub. No.: WO2009/110616
PCT Pub. Date: Sep. 11, 2009

(65) Prior Publication Data
US 2011/0035747 A1    Feb. 10, 2011

(30) Foreign Application Priority Data
Mar. 7, 2008  (JP) .................................. 2008-058827

(51) Int. Cl.
*G06F 9/46* (2006.01)

(52) U.S. Cl.
USPC .......................................... 718/100; 717/120

(58) Field of Classification Search
USPC ..................................... 717/120, 167; 718/1
See application file for complete search history.

(56) References Cited

U.S. PATENT DOCUMENTS

| | | | |
|---|---|---|---|
| 5,797,012 A * | 8/1998 | Blainey et al. ................ | 717/157 |
| 7,197,747 B2 * | 3/2007 | Ishizaki et al. ................ | 717/146 |
| 8,234,641 B2 * | 7/2012 | Fitzgerald et al. ............. | 718/1 |
| 2005/0102667 A1 * | 5/2005 | Barta et al. ..................... | 717/174 |
| 2007/0300221 A1 * | 12/2007 | Hartz et al. ..................... | 718/1 |
| 2008/0016115 A1 * | 1/2008 | Bahl et al. ..................... | 707/104.1 |
| 2008/0163171 A1 * | 7/2008 | Chess et al. .................... | 717/120 |

FOREIGN PATENT DOCUMENTS

| | | |
|---|---|---|
| JP | 8-69364 A | 3/1996 |
| JP | 10-149347 A | 6/1998 |
| JP | 2000-35957 A | 2/2000 |
| JP | 2001-5865 A | 1/2001 |
| JP | 2005-332223 A | 12/2005 |
| JP | 2006-293592 A | 10/2006 |
| JP | 2007-158870 A | 6/2007 |

OTHER PUBLICATIONS

"VMware Virtual Disks, Virtual Disk Format 1.0", VMware Technical Note, pp. 1-13.
"Open Virtual Machine Format Specification (OVF)", OVF specification version 0.9, Sep. 7, 2009.
International Search Report of PCT Application No. PCT/JP2009/054342 mailed Jun. 9, 2009.

* cited by examiner

*Primary Examiner* — Diem Cao

(57) ABSTRACT

Provided is a virtual machine package generation method that decreases the dependency relationships between virtual machine packages when generating a virtual machine package from a distributed system.

The method comprises: a virtual machine image generation function that generates a virtual machine image from a configuration and a connection relationship of a subject computer system; a virtual machine package setting file generation function that generates a setting file of a virtual machine package by analyzing the dependency relationships between the subject computer systems; and a virtual machine package generation function that stores the virtual machine image and the virtual machine package setting file as a virtual machine package.

18 Claims, 24 Drawing Sheets

Fig.8
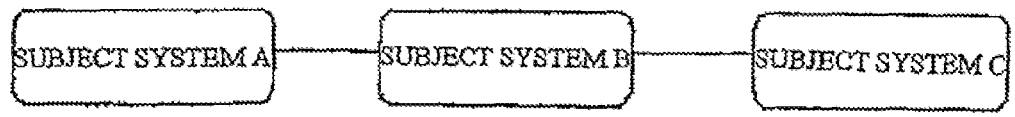
Fig.9
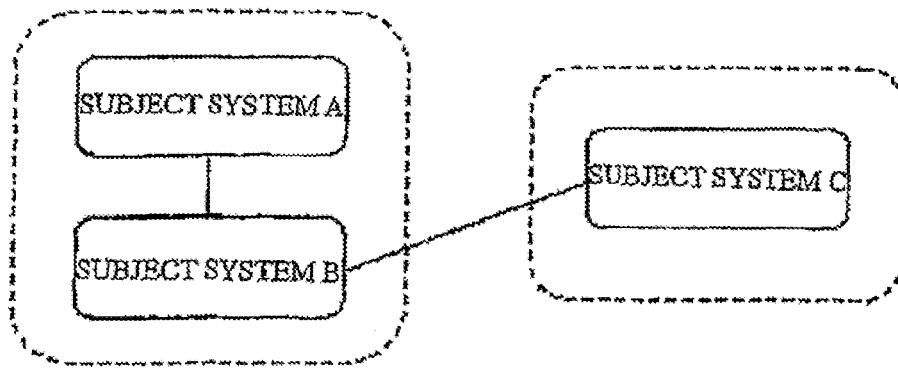
Fig.10
```
VIRTUAL MACHINE PACKAGE AB
SETTING FILE
    IP ADDRESS
    VLAN ID
    ADDRESS AND PORT OF
    APPLICATION C
```
```
VIRTUAL MACHINE PACKAGE C
SETTING FILE
    IP ADDRESS
    VLAN ID
```

Fig.13
```
NETWORK   RESOURCE INFORMATION
SUBJECT SYSTEM A—SUBJECT SYSTEM B    MAXIMUM TRAFFIC : 100Kbps
SUBJECT SYSTEM B—SUBJECT SYSTEM C    MAXIMUM TRAFFIC : 1Mbps
```
Fig.14
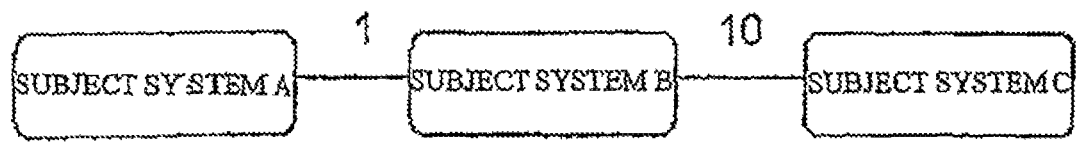
Fig.15
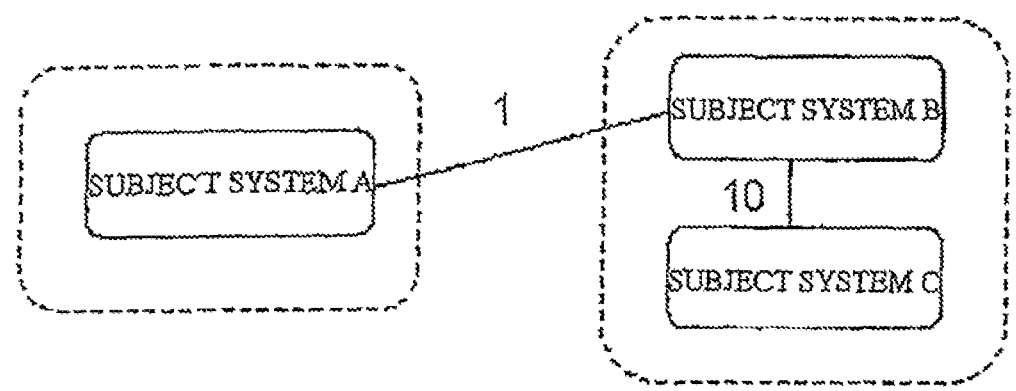

```
SERVER PERFORMANCE
INFORMATION
  SUBJECT SYSTEM A     CPU 2GHz, 30% AT PEAK TIME

SUBJECT  SYSTEM B     CPU 2GHz, 40% AT PEAK TIME

SUBJECT  SYSTEM C     CPU 2GHz, 90% AT PEAK TIME
```

```
PHYSICAL SERVER
LIMITATION

PHYSICAL SERVER X        CPU 2GHz

PHYSICAL SERVER Y        CPU 2GHZ
```

Fig.28

VIRTUAL MACHINE PACKAGE 1 SETTING FILE

IP ADDRESS=192.168.10.1

VLAN ID=7

WEB SERVER 1=192.168.10.4:80

WEB SERVER 4=192.168.10.3:80

AP SERVER 2=192.168.10.2:8080

FILE SERVER =192.168.10.3/NFS

---

VIRTUAL MACHINE PACKAGE 2 SETTING FILE

IP ADDRESS=192.168.10.2

VLAN ID=7

AP SERVER 3=192.168.10.4:8080

---

VIRTUAL MACHINE PACKAGE 3 SETTING FILE

IP ADDRESS=192.168.10.3

VLAN ID=7

---

VIRTUAL MACHINE PACKAGE 4 SETTING FILE

IP ADDRESS=192.168.10.4

VLAN ID=7

DB SERVER =192.168.10.2/MySQL

VIRTUAL MACHINE PACKAGE GENERATION SYSTEM, VIRTUAL MACHINE PACKAGE GENERATION METHOD, AND VIRTUAL MACHINE PACKAGE GENERATION PROGRAM

The present application is the National Phase of PCT/JP2009/054342, filed Mar. 6, 2009, which claims priority based on Japanese patent application No. 2008-058827 filed on Mar. 7, 2008.

FIELD OF THE INVENTION

The present invention relates to a virtual machine package generation system, virtual machine package generation method, and virtual machine package generation program, and more specifically relates to a virtual machine package generation system, virtual machine package generation method, and virtual machine package generation program that is able to decrease dependency relationships between virtual machine packages when generating a plurality of virtual machine packages from an already constructed system to generate highly reusable virtual machine packages.

BACKGROUND OF THE INVENTION

In order to fully describe current technical level relating to the invention, all descriptions of all the patents, patent applications, patent publications, scientific articles and the like, cited or specified herein are incorporated by reference herein.

Virtual machine technologies use software to enable creation of a plurality of pseudo computer hardware pieces on a single computer hardware (a physical machine). The pseudo computer hardware is called a virtual machine. The virtual machine is able to run an operating system (an OS) and an application program (an application) just like a physical machine. An OS and an application can be executed on a variety of physical machines with a virtual machine environment, without depending on a hardware configuration of a physical machine.

A virtual machine in which an OS or an application has been installed can be reused by being stored in a virtual machine format. Non-Patent Document 1 discloses VMDK that is a virtual machine disk format of a virtual machine runtime environment, VMware ESX Server. A virtual machine stored in VMDK can be reproduced by being distributed to another VMware ESX Server environment.

Such a storage and reproduction technique of a virtual machine is expected to be used in a variety of industrial applications. For example, the technique is expected to be applied to disaster recovery that reproduces a system damaged in a time of a large-scale disaster at another site. Also, when constructing a system, the technique can be used for a purpose to transfer a system constructed in a test environment to a real environment as is.

However, the storage and reproduction technique of a virtual machine alone is not sufficient when considering that general enterprise systems and data centers are distributed systems in which a plurality of computers are connected via a network. Not only the configurations of an OS and application running on a single computer, but also configurations as a distributed system including network settings and application communications should be stored and reproduced.

To that end, an approach to package a plurality of virtual machines in a manner incorporating configuration information specific to a distributed system and store as a virtual machine package is being considered. Standardization of the format of the virtual machine package is now undertaken as OVF (Open Virtual Machine Format) of DMTF (Distributed Management Task Force). While the OVF defines the format, how to divide and package a distributed system is not prescribed.

Non-Patent Document 1: Technical Note, Virtual Disk Format 1.0, VMWare, Inc.
Non-Patent Document 2: Open Virtualization Format Specification, DSP0243, Distributed Management Task Force, Inc. (2010)
Patent Document 1: JP-A-2001-5865
Patent Document 2: JP-A-2006-293592
Patent Document 3: JP-A-2007-158870
Patent Document 4: JP-A-H8-69364

DISCLOSURE OF THE INVENTION

Problems that the Invention is to Solve

Although virtual machines such as the ones described in Patent Documents 1 to 4 and the like have already been disclosed, the problems below are still not solved.

The problems that the invention is to solve are as follows.

A first problem is that a virtual machine package generated from a distributed system has low reusability as a package and requires a lot of setting tasks at the time of distribution thereof. This is attributable to a large number of dependency relationships between virtual machine packages that remain when dividing a distributed system into the virtual machine packages, thereby requiring setting tasks to solve the dependency relationships in accordance with the environment to which the packages are distributed.

A second problem is that a virtual machine package generated from a distributed system on the assumption to run on a single physical machine places a heavy load on a network to which the package is distributed. This is because a large number of dependency relationships between virtual machine packages remain when dividing a distributed system into virtual machine packages, thereby requiring communications in the network to which the packages are distributed.

Thus, the object of the invention is to provide a virtual machine generation method that minimizes the dependency relationships between virtual machine packages to the extent possible when generating virtual machine packages from a distributed system.

Means for Solving the Problems

To solve the above-described problems, the virtual machine package generation system of the invention comprises a virtual machine image generation function and a virtual machine package setting file generation function; the virtual machine setting file generation function comprises an analysis information collection unit that collects the result of analyzing a program running in a subject system and setting information thereof, a graph structure conversion unit, a contracted graph generation unit, and a virtual machine package setting file generation unit; and the virtual machine package generation system operates to structure the dependency relationships of subject systems in a graph, contract the graph to minimize the weight of the edges, capture virtual machine packages candidates, and generate a setting file of the virtual machine packages. The object of the invention can be achieved by employing such a structure to decrease the dependency relationships between virtual machine packages.

Moreover, to achieve the object of the invention, the virtual machine package generation method of the invention generates a virtual machine image from the configuration and connection relationship of a subject computer system, analyzes the dependency relationships between subject computer systems, generates a virtual machine package setting file, and stores the virtual machine image and the virtual machine package setting file as a virtual machine package.

Further, to achieve the object of the invention, the program of the invention causes a computer to run processes of generating a virtual machine image from the configuration and connection relationship of a subject computer system, analyzing the dependency relationships between subject computer systems, generating a virtual machine package setting file, and storing the virtual machine image and virtual machine package setting file as a virtual machine package.

Advantageous Effect of the Invention

A first advantage is that the reproduction of a distributed system by way of distributing a virtual machine package can be processed promptly.

This is because the decrease in dependency relationships between virtual machine packages decreases the points requiring setting modifications in accordance with the system environment to which the packages are distributed, thereby saving the time required for setting tasks.

A second advantage is enhanced reusability of a virtual machine package. This is because the decrease in dependency relationships between virtual machine packages realizes reproduction of the virtual machine packages in a different system with a small number of setting items.

A third advantage is that when distributing a virtual machine package by associating the package to a single physical server, the network load of the system to which the virtual machine package is distributed can be decreased.

This is because the decrease in dependency relationships between virtual machine packages decreases the processes to communicate via the network to which the virtual machine packages are distributed.

BRIEF DESCRIPTION OF THE DRAWINGS

FIG. 8 is a diagram showing an illustrative example in which subject systems of the best mode for carrying out the first aspect of the invention are converted into a graph structure.

FIG. 9 is a diagram showing a graph configuration in which the graph structure representing subject systems of best mode for carrying out the first aspect of the invention is contracted.

FIG. 10 is a diagram showing an illustrative example of virtual machine package setting files of the best mode for carrying out the first aspect of the invention.

FIG. 13 is a diagram showing an illustrative example of network resource information of the best mode for carrying out the second aspect of the invention.

FIG. 14 is a diagram showing the configuration of a graph in which subject systems of the best mode for carrying out the second aspect of the invention are converted into a graph structure and edge-weighted using the network resource information.

FIG. 15 is a diagram showing the configuration of a graph in which the graph structure representing subject systems of the best mode for carrying out the second aspect of the invention is contracted.

FIG. 28 is a diagram showing an illustrative example of virtual machine package setting files of the example of the invention.

Figure 1:
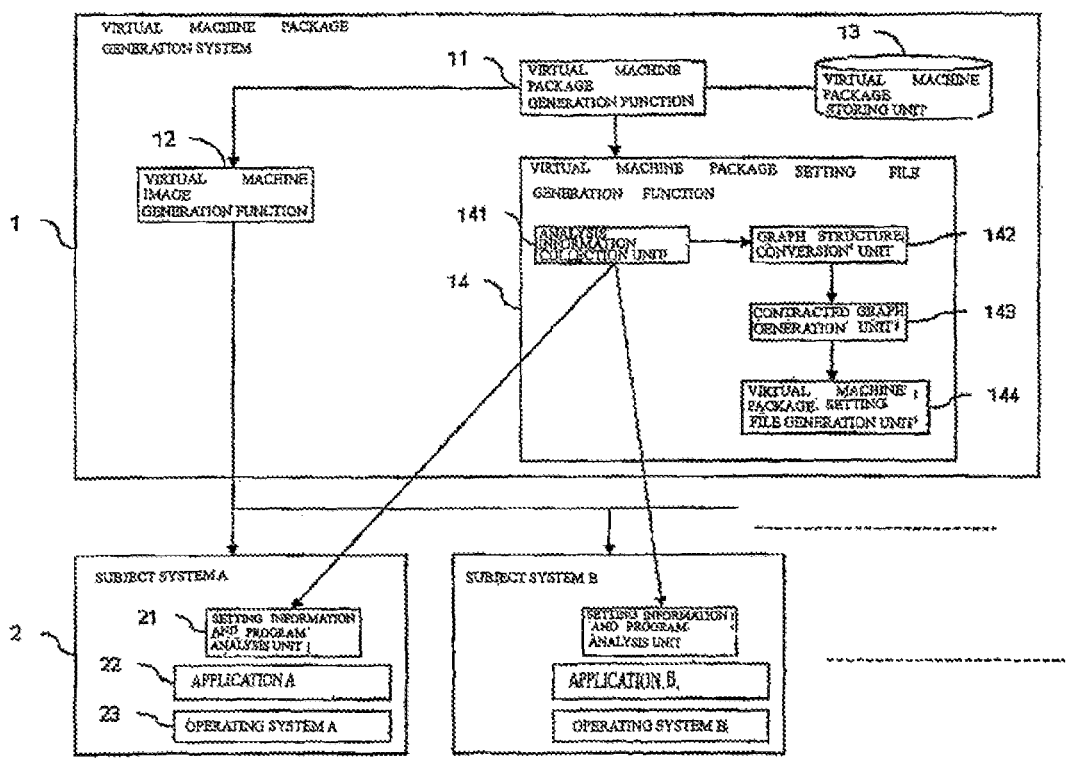
FIG. 1 is a block diagram showing the configuration of the best mode for carrying out a first aspect of the invention.

EXPLANATION OF REFERENCES 1 virtual machine package generation system
2 subject system
11 virtual machine package generation function
12 virtual machine image generation function
13 virtual machine package storing unit
14 virtual machine package setting file generation function
21 setting information and program analysis unit
22 application program (application)
23 operating system (OS)
131 virtual machine package
132 virtual machine image
133 setting file
141 analysis information collection unit
142 graph structure conversion unit
143 contracted graph generation unit
144 virtual machine package setting file generation unit
145 network resource information storing unit
146 server performance information storing unit
147 physical server limitation storing unit
500 load balancer
501 web server
505 AP server
505 AP server
507 DB server

BEST MODE FOR CARRYING OUT THE INVENTION

Next, the best mode for carrying out the invention is described in detail with reference to the drawings.

Referring to FIG. 1, a first embodiment of the present invention comprises a virtual machine package generation system 1 for generating a virtual machine package and a plurality of subject systems 2 constituting a subject distributed system.

A subject system 2 includes an operating system (OS) 23 and an application program (an application) 22 that run on a computer (a central processor; processor; data processing device) as well as a setting information and program analysis unit 21 that analyzes a program constituting the OS 23 or application 22 or setting information thereof.

A virtual machine package generation system 1 includes a virtual machine package generation function 11, a virtual machine image generation function 12, a virtual machine package storing unit 13, and a virtual machine package setting file generation function 14.

Figure 2:
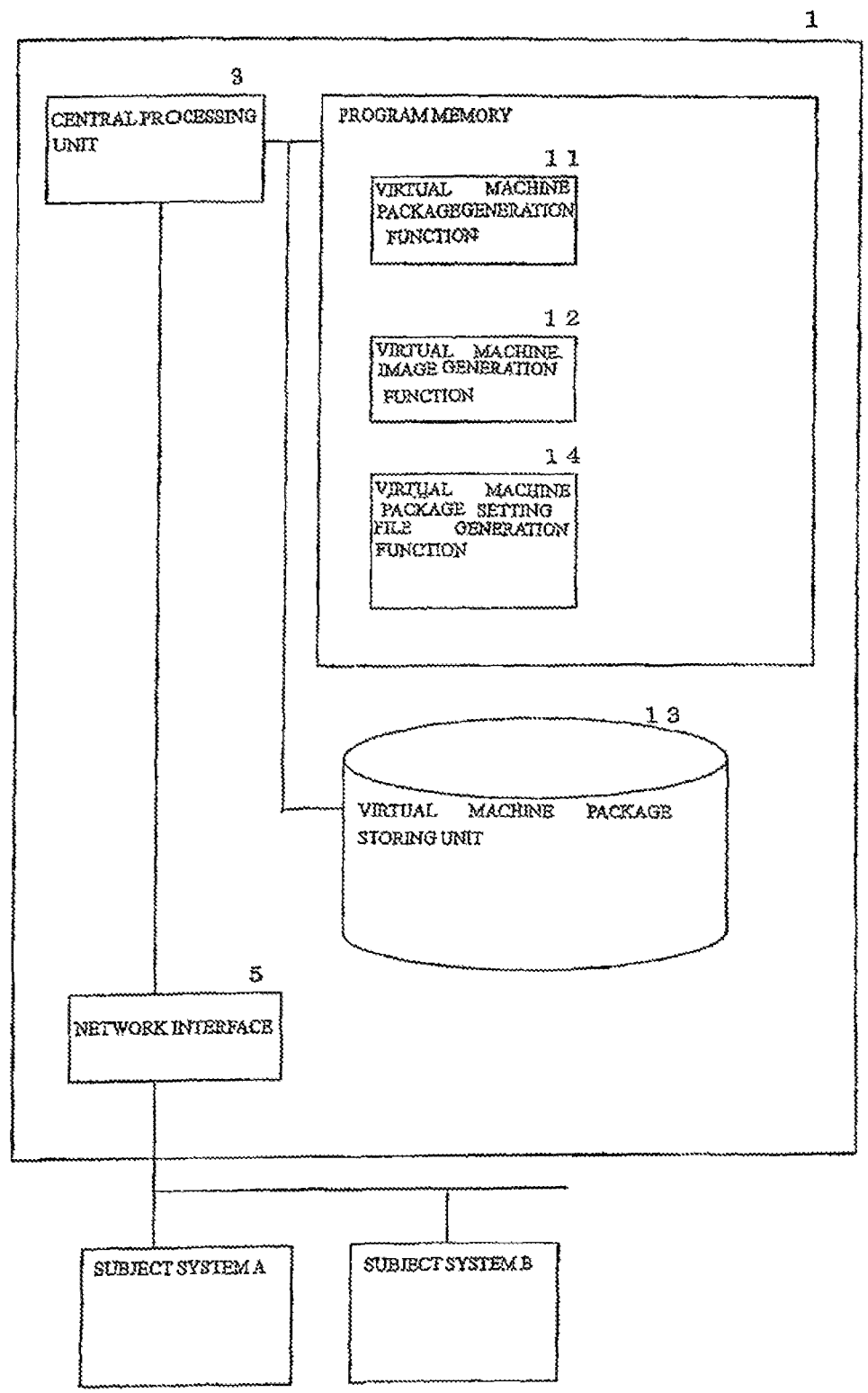
FIG. 2 is a block diagram showing the configuration of a virtual machine package of the best mode for carrying out the first aspect of the invention.

Here, a configuration example of a case in which a virtual machine package generation system 1 comprises a computer including a single central processing unit and a memory element, such as a server, is shown in FIG. 2. The virtual machine package generation system 1 comprises a central processing unit 3, a program memory, a virtual machine package storing unit 13, and a network interface 5, and the program memory stores a virtual machine package generation function 11, a virtual machine image generation function 12, and a virtual machine package setting file generation function 14. The virtual machine package generation system 1 is connected to a subject system A via the network interface 5. The program having such functions runs in combination with the central processing unit 3.

Further, the virtual machine package setting file generation function 14 includes an analysis information collection unit 141, a graph structure conversion unit 142, a contracted graph generation unit 143, and a virtual machine package setting file generation unit 144.

These functions generally operate as follows, respectively.

Figure 3:
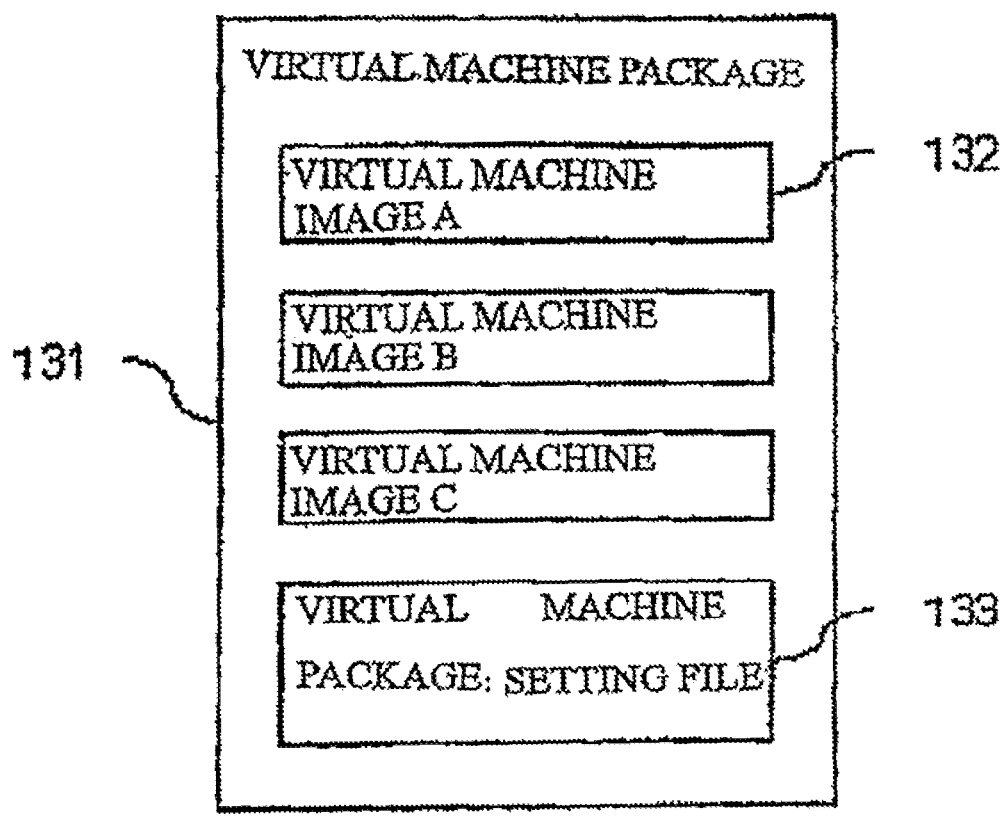
FIG. 3 is a block diagram showing the configuration of a virtual machine package of the best mode for carrying out the first aspect of the invention.

The virtual machine package generation function 11 creates a virtual machine image from the configuration of the subject system 2 and connection relationships thereof using the virtual machine image generation function 12. Further, the virtual machine package generation function 11 creates a virtual machine package setting file using the virtual machine package setting file generation function 14, then, stores the created virtual machine image and virtual machine package setting file as a virtual machine package in the virtual machine package storing unit 13. FIG. 3 shows an example of a virtual machine package. The virtual machine package 131 stored in the virtual machine package storing unit 13 comprises a plurality of virtual machine images 132 and a setting file 133 that describes elements to be configured when distributing and using the virtual machine package.

In the virtual machine setting file generation function 14, the analysis information collection unit 141 collects information relating to the dependency relationships between subject systems obtained from the setting information and program analysis units 21 of the plurality of subject systems 2. The collected information is input to the graph structure conversion unit 142 and converted into a graph structure that expresses dependency relationships of the subject systems with points and lines. The contracted graph generation unit 143 groups the subject systems by generating a contracted graph of the generated graph structure, and extracts virtual machine package candidates. The virtual machine package setting file generation unit 144 identifies the dependency relationships between virtual machine packages based on the generated contracted graph and describes setting elements for solving the dependency relationships in a setting file.

Figure 6:
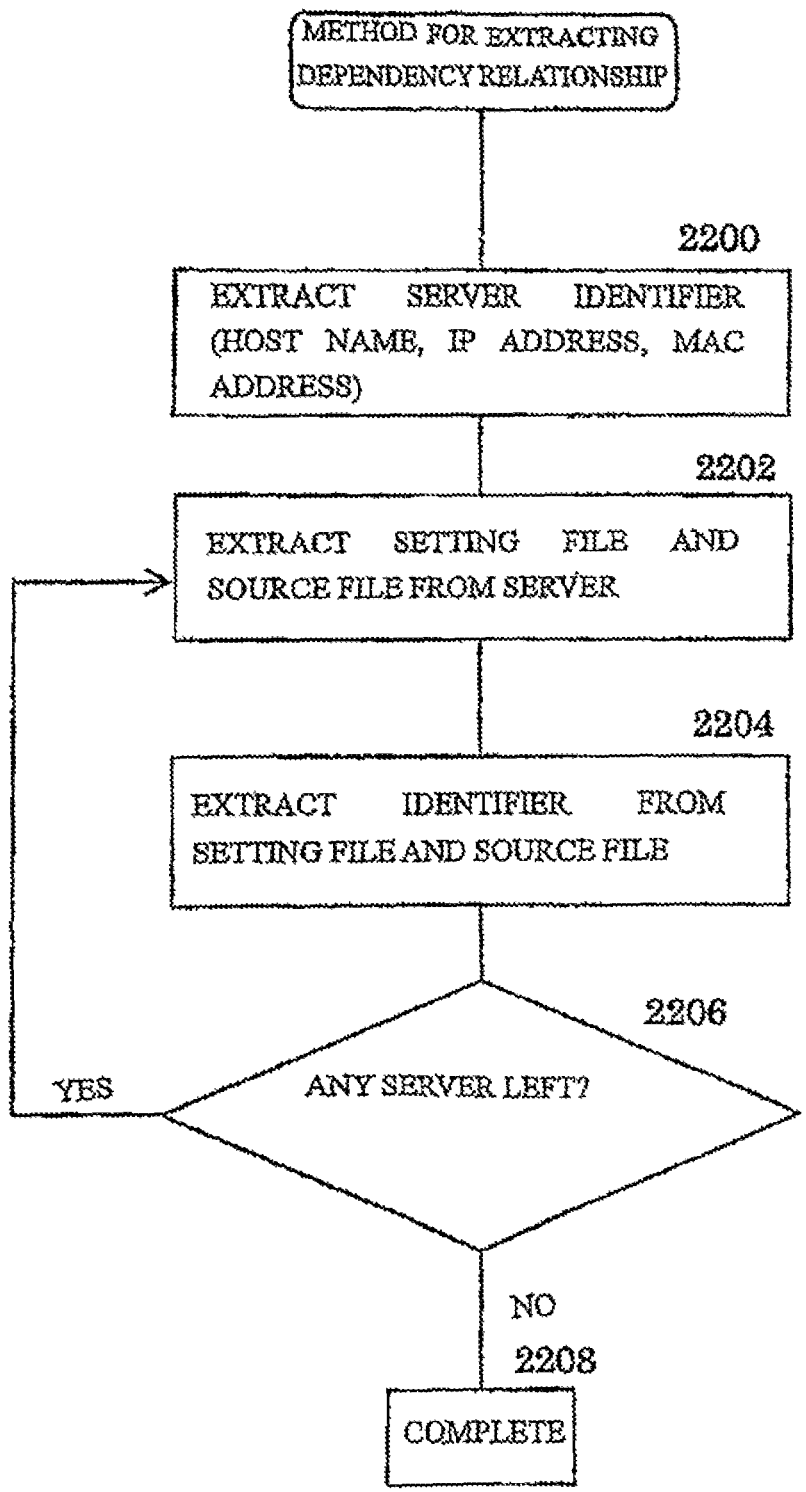
FIG. 6 is a flowchart of a method for extracting the dependency relationships of subject systems of the best mode for carrying out the first aspect of the invention.

The method for extracting these dependency relationships is described with reference to FIG. 6. First, server identifier information that identifies each server is extracted from a file system stored in each server. Specifically, host name, IP address, and MAC address information is extracted (2200).

Further, a setting file and the source file of an application are extracted from each server (2202). Next, from the extracted setting file and source file, the server identifier information extracted in 2200 is extracted and which setting files and servers have dependency relationships and which applications and servers have dependency relationships are extracted (2204). The extractions are carried out server-by-server and dependency relationships are extracted until there is no server left (2206). If there is any server left, steps from 2202 are repeated and the process completes when extractions are carried out for all servers (2208).

Figure 4:
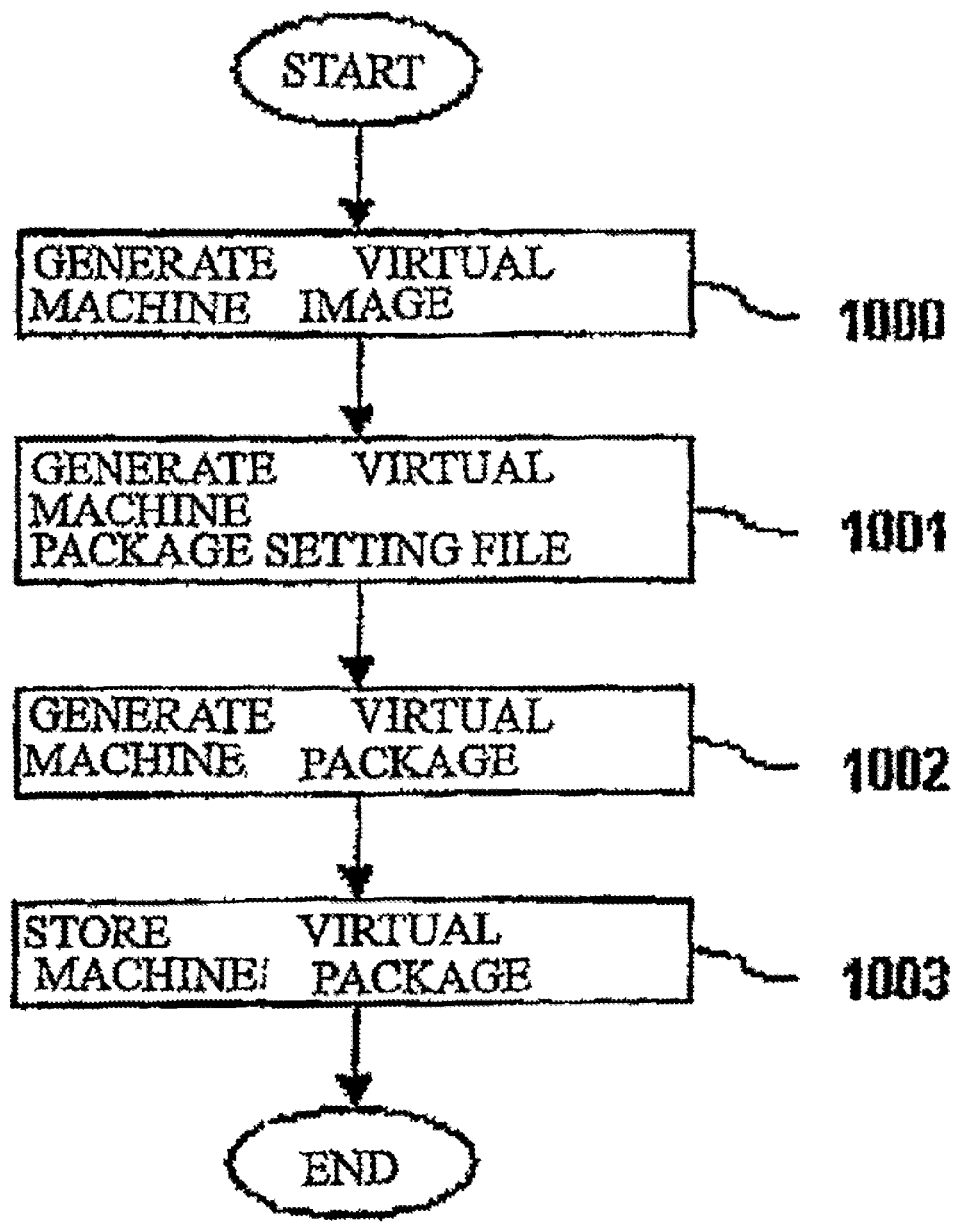
FIG. 4 is a flowchart showing the operation of a virtual machine package generation process of the best mode for carrying out the first aspect of the invention.
Figure 5:
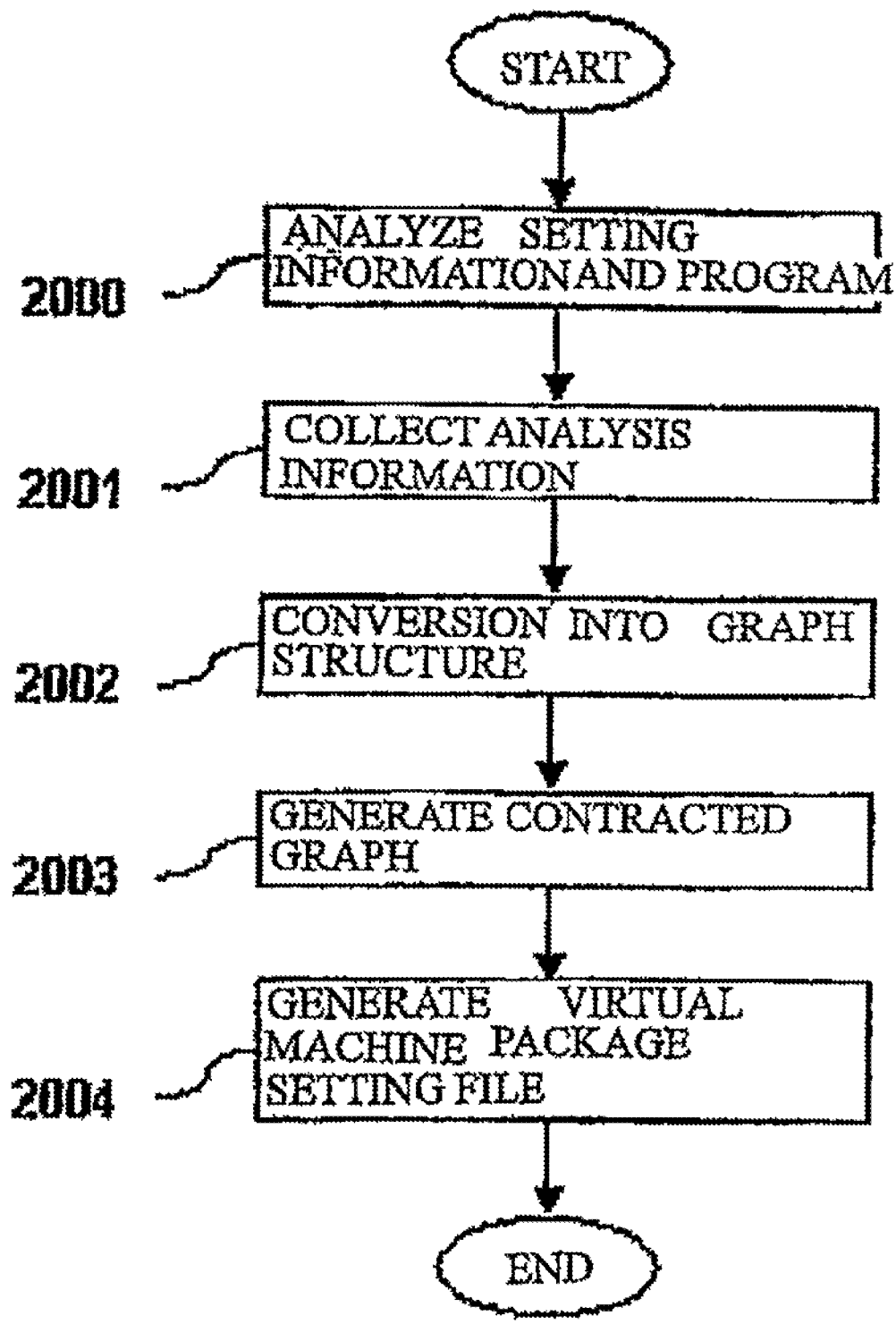
FIG. 5 is a flowchart showing the operation of a virtual machine package setting file generation process of the best mode for carrying out the first aspect of the invention.

Next, referring to the flowcharts of FIGS. 4 and 5, overall operation of the embodiment is described in detail. At first, the virtual machine package generation function 11 creates a virtual machine image of a subject system 2 using the virtual machine image generation function 12 (step 1000 of FIG. 5). The virtual machine image is generated from each subject system, and virtual machine images are generated as many as the number of subject systems.

There are two methods for generating a virtual machine image from an existing system. A first method is to use a virtualization function to reconstruct a virtual machine that has the same configuration as the subject system from scratch. Specifically, an administrator designs the specification of a virtual machine and the administrator completes the reconstruction by itself while creating a setting file according to the specification. This method requires the administrator to understand the construction of the system in detail, and takes tremendous man-hours. On the other hand, a second method is a method in which a virtual machine whose setting is scalable and whose necessary setting file is prepared in advance is activated while, at the same time, a physical server to be transferred to the virtual machine is activated, then, the data in the physical server is sequentially copied to the virtual machine. In this case, the administrator's man-hours can be reduced by copying the data while extracting necessary information from the physical server.

Specifically, the virtual machine image generation function 12, first, installs all data for generating a destination virtual machine in the destination device and generates the destination virtual machine.

The virtual machine image generation function 12 installs, in the original physical server and destination virtual machine, boot image systems that are boot files used when booting them up, respectively.

The original physical server and destination virtual machine are both reactivated, and acquire IP addresses from a DHCP server connected therewith. Next, the virtual machine image generation function 12 transfers files from the original physical server to the destination virtual machine using the boot image.

The system of the destination virtual machine including the drivers is modified. The boot image systems are deleted and the transfer completes.

Next, the virtual machine package generation function 11 uses a virtual machine package setting file generation function 14 to generate a virtual machine package setting file (step 1001).

The virtual machine package generation function 11 stores the virtual machine image and virtual machine package setting file in an archive or a specific directory to create a virtual machine package (step 1002).

Specifically, a file corresponding to the specific directory is generated, whose header includes the description of a file name, file mode, file owner name, file size, and each file name of files that collect file correction time information, checksum information, and link information, respectively, and whose real data is stored with the header as one piece of data. For example, tar command of UNIX (registered trade mark), which is a command used for archiving, can be alternatively used. When compressing the file, compress, gzip, or bzip2 command can also be used.

Further, the created virtual machine package is stored in a predetermined storing place (step 1003). Specifically, virtual machine package data generated by the command is stored in the specific directory.

Figure 7:
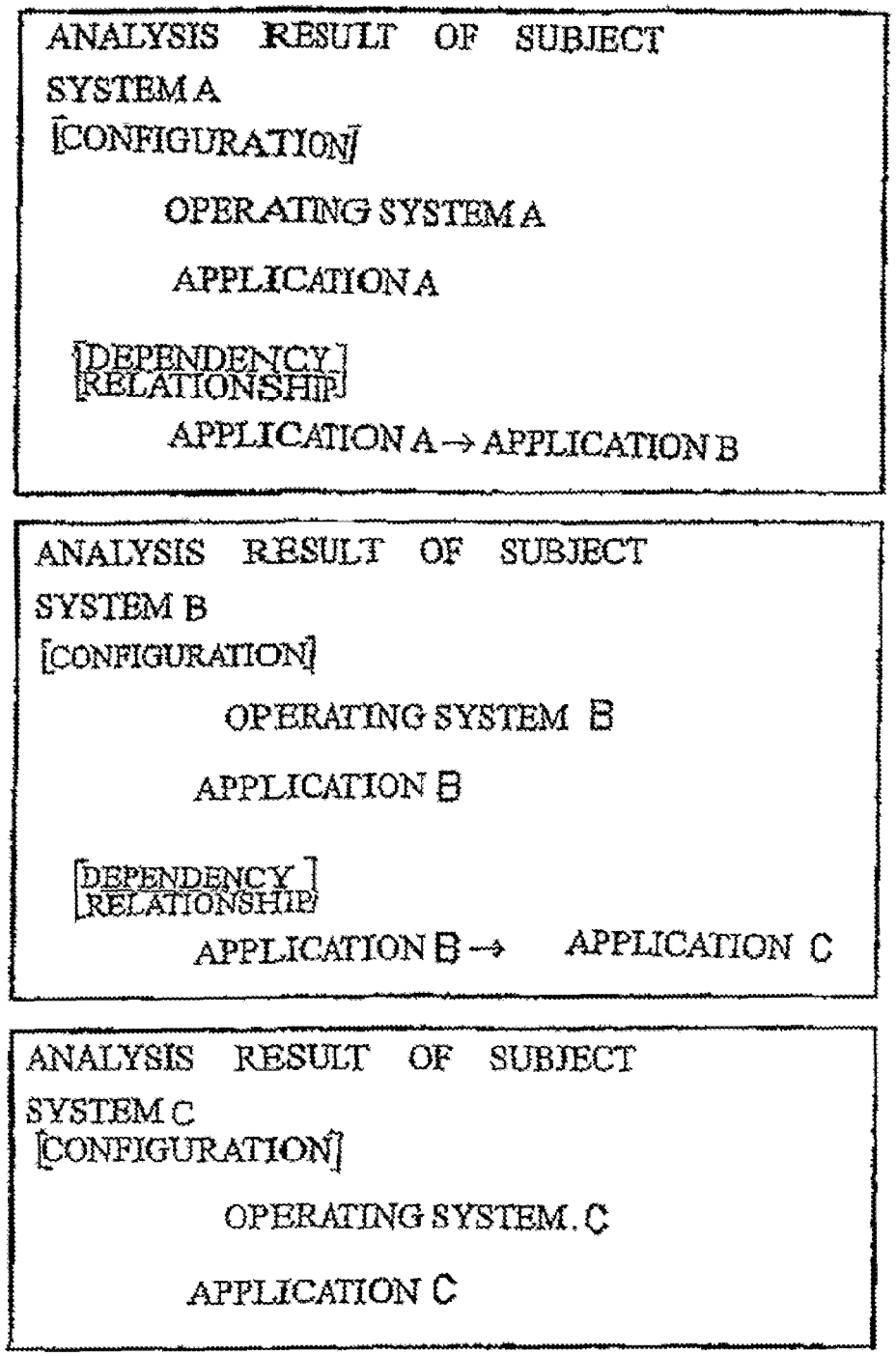
FIG. 7 is diagram showing an illustrative example of the analysis result of the dependency relationships of subject systems of the best mode for carrying out the first aspect of the invention.

FIG. 5 is a flowchart for describing the operation of generating a virtual machine package setting file. At first, in the subject system 2, the network setting and communication relationship of the OS and application running in the subject system are extracted using the setting information and program analysis unit 21 (step 2000). FIG. 7 shows an example of the analysis result in which three subject systems, A, B, and C, exist. In this example, FIG. 7 shows the relationship in which application A invokes application B, and application B invokes application C.

Next, the analysis information collection unit 141 collects the analysis result (step 2001).

Also, the collected analysis result is input into the graph structure conversion unit 142 so that the dependency relationships between the subject systems are converted into a graph structure (step 2002). In the example of FIG. 7, based on the invoking relationship between the applications, the graph structure shown in FIG. 8 is obtained. Specifically, the program defines one system as one node, defines one connection relationship between systems as one edge connecting the nodes, and abstracts each system shown in FIG. 6 as a node and the connection as an edge in a graph.

Further, the contracted graph generation unit 143 generates a contracted graph in which nodes are contracted in a way to decrease the number of edges (2003). In FIG. 9, subject systems A and B are contracted and only the edge connecting subject systems B and C is retained.

Since the generation of a contracted graph to minimize the number of edges can be formulated as an optimization problem, the problem is solved by a heuristic approach that is used to calculate an approximate solution. In this case, the approximate solution is calculated from a subroutine using a heuristic approach. As an example of a contracted graph, the following describes a case in which the contracted graph shown in FIG. 9 is obtained. In this example, subject systems A and B are contracted and expressed as one point. One point in the generated contracted graph is treated as one virtual machine package, and a virtual machine package setting file is generated by the virtual machine package setting file generation unit 144 (2004).

An example of the virtual machine package setting file is shown in FIG. 10. In the setting file of virtual machine package AB that includes subject systems A and B, each system is contracted and the IP address and VLAN ID of the virtual machine package are set. As other item, setting items of an address and a port to communicate with application C are added. These are settings required for application B to communicate with application C.

Next, the advantage of the embodiment is described.

This embodiment can decrease dependency relationships between virtual machine packages, since the embodiment analyzes the dependency relationships between the subject systems from which a virtual machine package is generated, creates a graph structure based on the analysis result, generates a contracted graph in a way to reduce the number of edges, and generates a setting file by capturing virtual machine package candidates.

Next, the best mode for carrying out the second aspect of the invention is described in detail with reference to the drawings.

Figure 11:
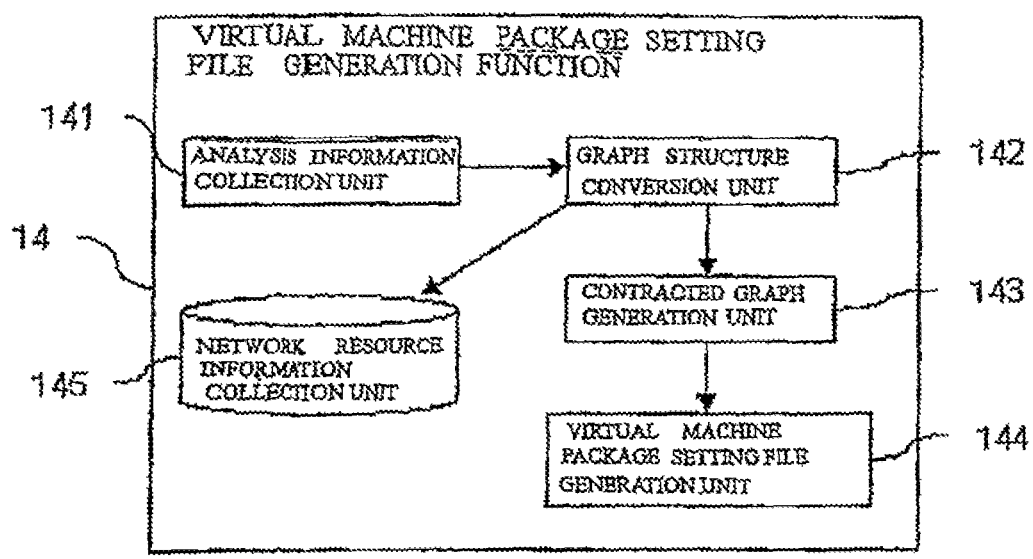
FIG. 11 is a block diagram showing the configuration of a virtual machine package setting file generation function of the best mode for carrying out a second aspect of the invention.

FIG. 11 shows the configuration of a virtual machine package setting file generation function 14 of the best mode for carrying out the second aspect of the invention. In the virtual machine package setting file generation function, a graph structure conversion unit 142 refers to a network resource information storing unit 145, and weights the edges of the graph. The network resource information storing unit 145 stores information relating to the network resource between the subject systems (e.g., statistics of the broadband and the traffic).

Figure 12:
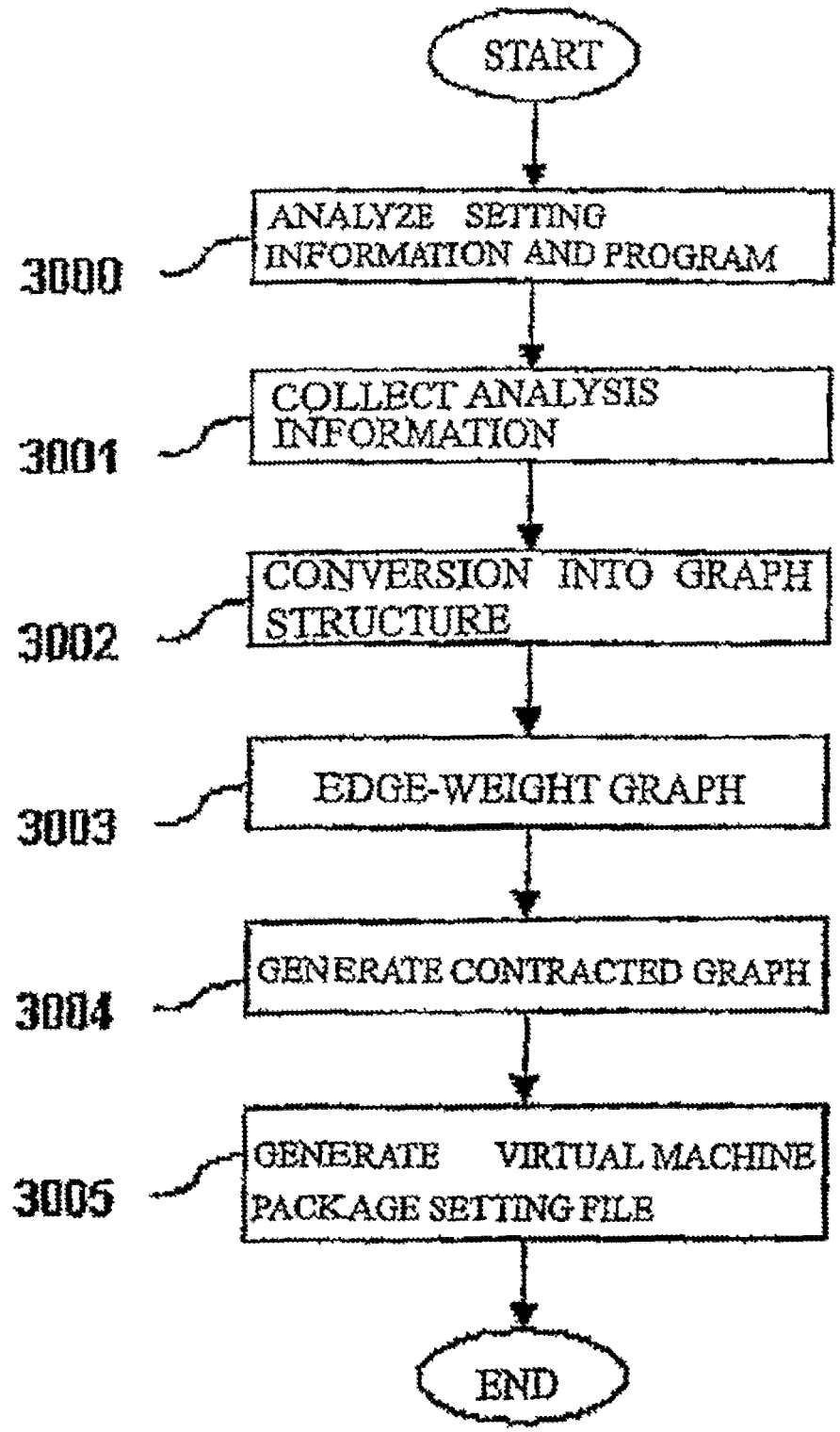
FIG. 12 is a flowchart showing the operation of a virtual machine package generation process of the best mode for carrying out the second aspect of the invention.

FIG. 12 is a flowchart showing the operation of the best mode for carrying out the second aspect of the invention.

First, in the subject system 2, the setting information and program analysis unit 21 is used to extract the network setting and communication relationship of the operating system and application running in the subject system (step 3000).

Next, the analysis information collection unit 141 collects the analysis result (step 3001).

The collected analysis result is input to the graph structure conversion unit 1.42 to convert the dependency relationship between the subject systems into a graph structure (step 3002).

Next, based on the network resource information stored in the network resource information storing unit 145, the edges of the graph are relatively weighted. For example, if there is network resource information such as in FIG. 13, the edges are weighted as in FIG. 14. The weighting is determined with reference to network resource information, such as network transfer rates. Further, the weighting may be done based on the number of setting items. The contracted graph generation unit 143 contracts the weighted graph to minimize the weight of the edge (step 3004). FIG. 15 shows an example of the generated contracted graph. To minimize the weight, nodes with large edge weight are contracted.

Based on the generated contracted graph, a setting file of the virtual machine package is generated (step 2005). The procedure for generating the whole virtual machine package is the same as the method shown in FIG. 4.

Next, the advantage of the best mode for carrying out the invention is described. The best mode for carrying out the invention can reduce a network load at the time of distribution of a virtual machine package since the graph is edge-weighted based on the network resource information and contracted in a way to minimize the weight of the edge. Particularly, when distributing the virtual machine package to a single physical server, the traffic between physical servers can be reduced.

Next, the best mode for carrying out a third aspect of the invention is described with reference to the drawings.

Figure 16:
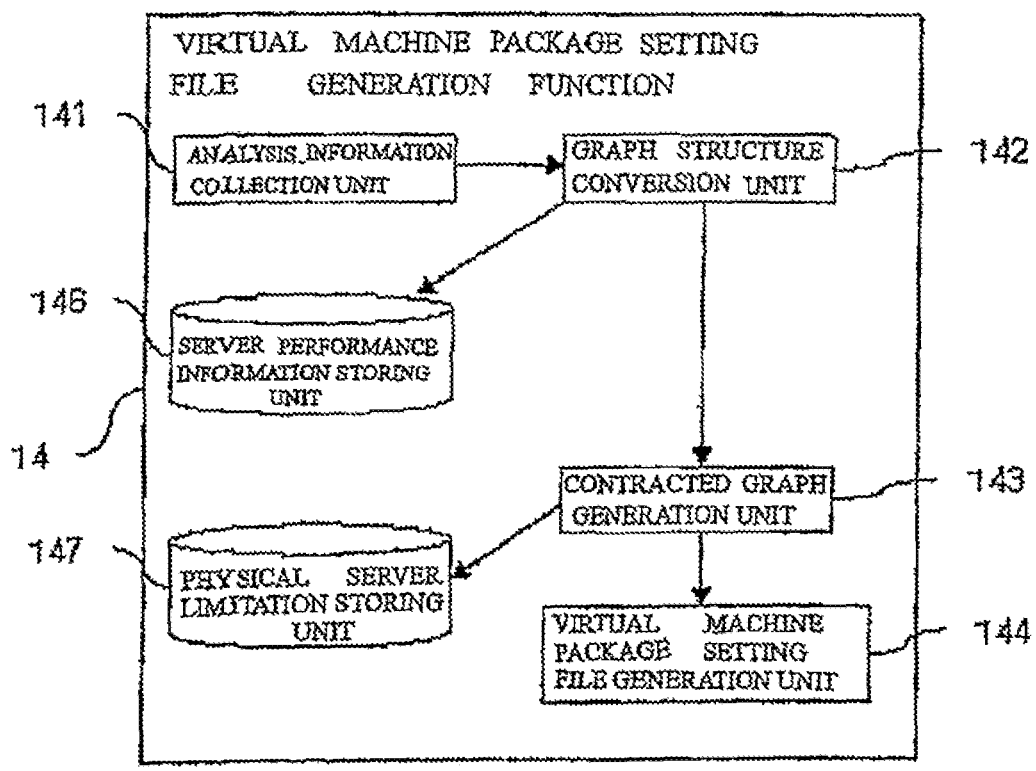
FIG. 16 is a block diagram showing the configuration of a virtual machine package setting file generation function of the best mode for carrying out a third aspect of the invention.

FIG. 16 shows the configuration of a virtual machine package setting file generation function of the best mode for carrying out the third aspect of the invention. In the virtual machine package setting file generation function 14, a graph structure conversion unit 142 refers to a server performance information storing unit 146 to point-weight the graph. Further, a contracted graph generation unit 143 refers to a physical server limitation storing unit 147 to contract the graph in accordance with the capacity of the destination physical server. The server performance information storing unit 146 stores information relating to the server performance of the subject system (e.g., a CPU utilization, CPU specification, memory capacity, memory utilization, disk bandwidth). The physical server limitation storing unit stores the capacity information of a physical server to which the virtual machine package is distributed (e.g., the number of operable virtual machines, CPU specification, memory capacity).

Figure 17:
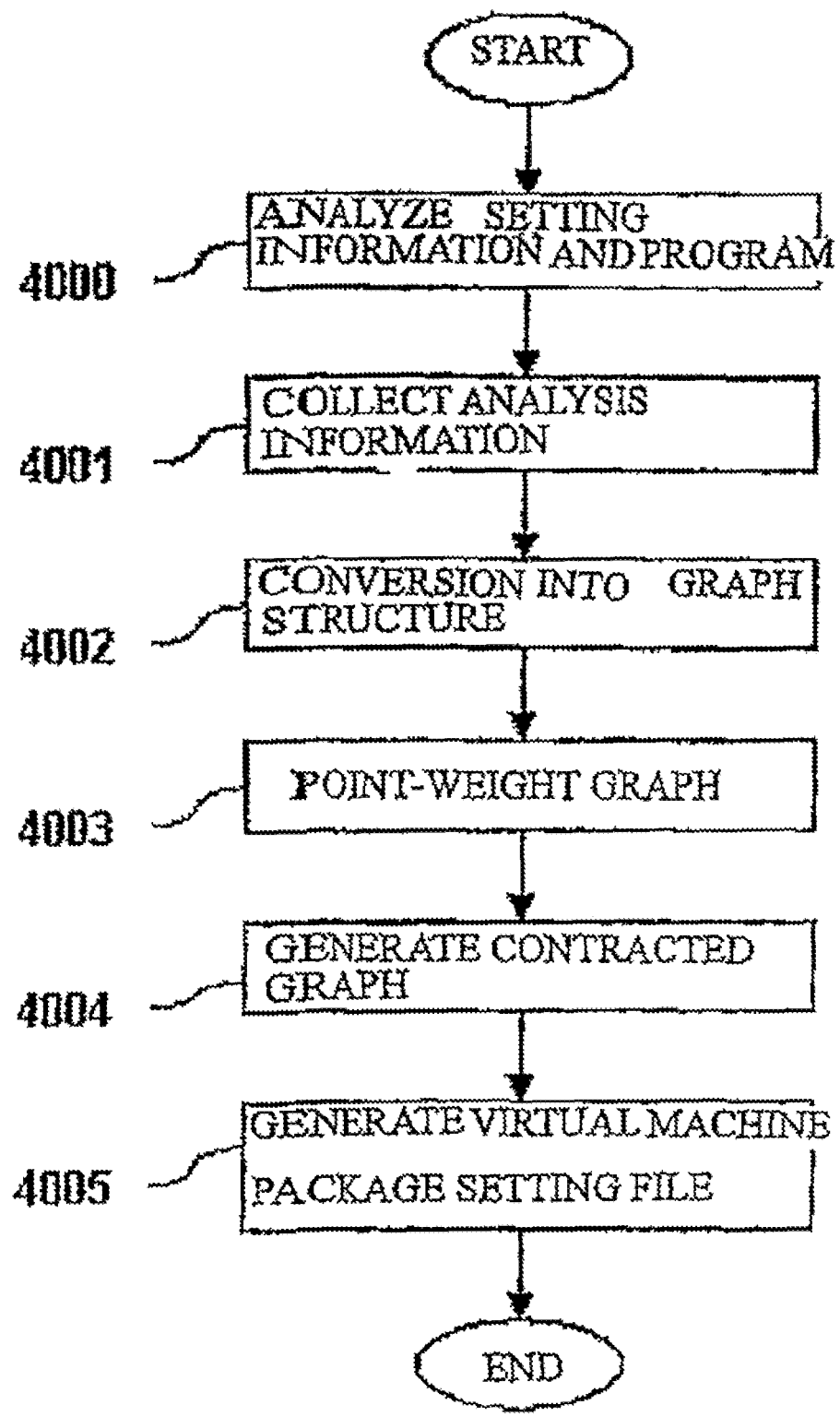
FIG. 17 is a flowchart showing the operation of a virtual machine package generation process of the best mode for carrying out the third aspect of the invention.

FIG. 17 is a flowchart showing the operation of the best mode for carrying out the third aspect of the invention.

At first, in the subject system 2, the setting information and program analysis unit 21 is used to extract the network setting and communication relationship of the OS and application running in the subject system (step 4000).

Next, the analysis information collection unit 141 collects the analysis result (step 4001).

Then, the collected analysis result is input into the graph structure conversion unit 142 so that the dependency relationships between subject systems are converted into a graph structure (step 4002).

Further, based on the server performance'information stored in the server performance information storing unit 145, the points of the graph are relatively weighted. For example, if there is server performance information as in FIG. 18, the graph is point-weighted as in FIG. 19 (step 4003).

Figures 18, 19, 20:
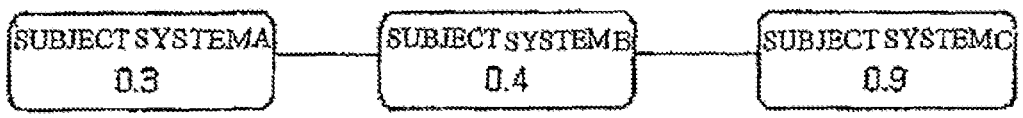
FIG. 18 is a diagram showing an illustrative example of server capacity information of the best mode for carrying out the third aspect of the invention.
FIG. 19 is a diagram showing the configuration of a graph in which subject systems of the best mode for carrying out the third aspect of the invention are converted into a graph structure and point-weighted using the network resource information.
FIG. 20 is a diagram showing an illustrative example of physical server limitations of the best mode for carrying out the third aspect of the invention.
Figure 21:
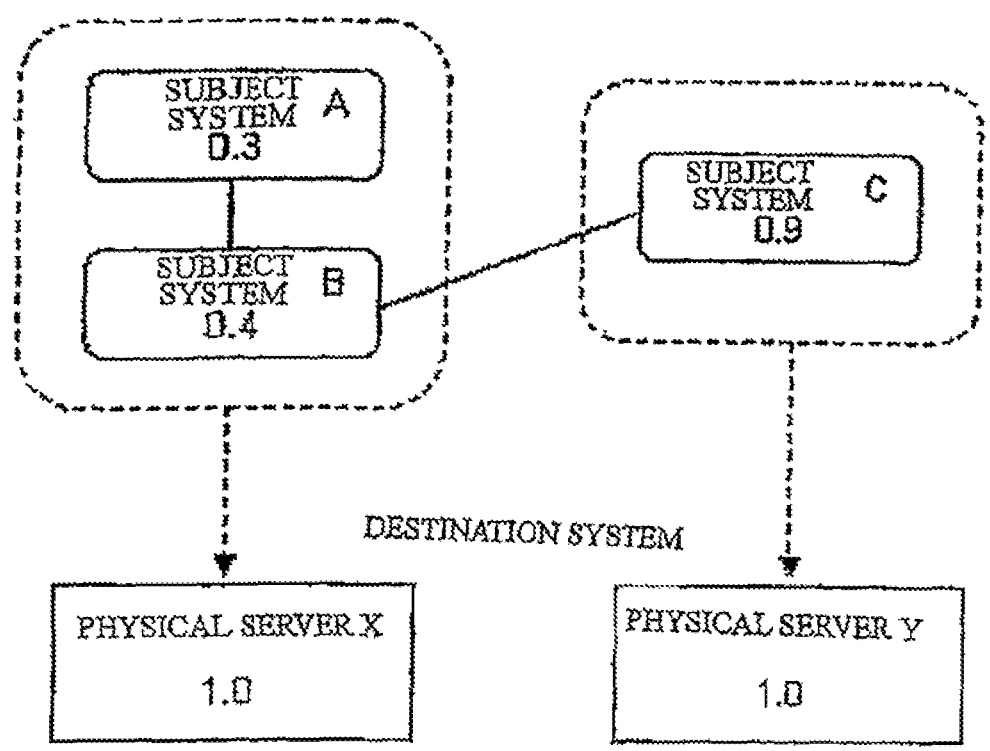
FIG. 21 is a diagram showing the configuration of a graph in which the graph structure representing subject systems of the best mode for carrying out the third aspect of the invention is contracted.

The contracted graph generation unit 143 refers to the physical server limitation storing unit 147 regarding the weighted graph, and contract the graph as far as the weight of each point does not become larger than a specified value (step 4004). For example, if there is physical machine limitation information as shown in FIG. 20, relative processing capacity of the destination physical machine can be estimated as 1.0, and the graph is contracted as far as the weight of each point of the contracted graph becomes 1.0 or less. An example of the generated contracted graph is shown in FIG. 21.

Based on the generated contracted graph, a setting file of the virtual machine package is generated (step 4005). The procedure for generating the whole virtual machine package is the same as shown in FIG. 4.

Next, the advantage of the best mode for carrying out the invention is described. The best mode for carrying out the invention can generate a virtual machine package storable in a single physical server since the graph is point-weighted based on the capacity information of the server and a contracted graph is generated by limiting the weights of the points of the contracted graph based on the capacity information of the destination physical server. If the virtual machine package is stored in a physical server, the dependency relationships within the virtual machine package are not required to be considered at the time of distribution thereof, thereby making the distribution of the virtual machine package easy.

EXAMPLES

Example 1

The following describes the operation of the best mode for carrying out the invention using a specific example.

Figure 22:
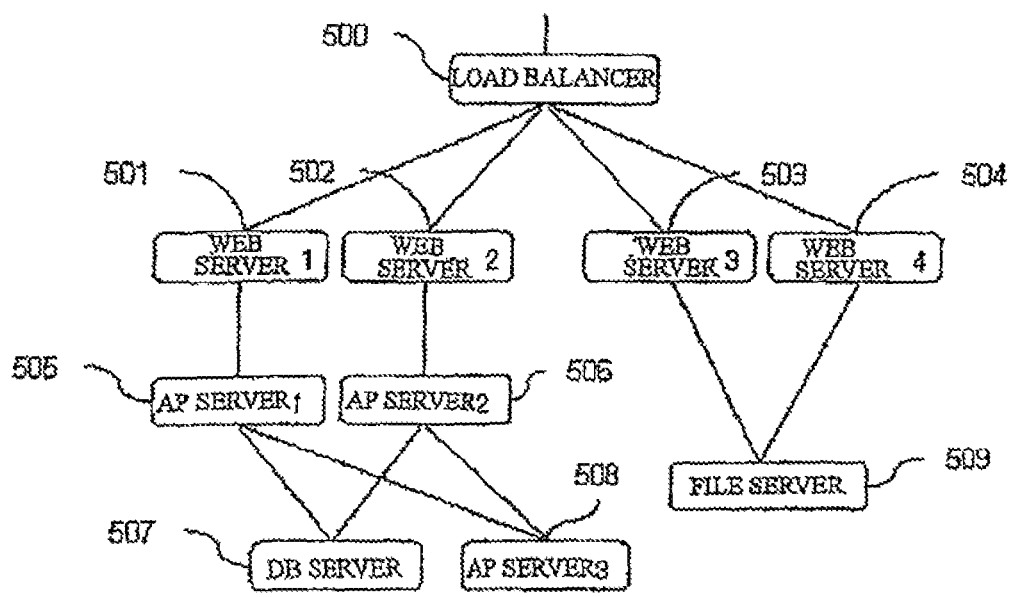
FIG. 22 is a diagram showing the configuration of a Web application system that is a subject of the example of the invention.

FIG. 22 shows an example where a Web application system is divided into and stored as virtual machine packages. The subject system comprises two Web application systems. Both Web application systems accept requests from clients via a load balancer 500. Each line between servers represents invoking relationship between the servers. For example, a Web server 501 invokes an AP (application) server 505, and the AP server 505 invokes a DB server 507.

At first, the virtual machine image generation function 12 generates a virtual machine image of each server that constitutes a Web application system. The virtual machine image is generated on the assumption that the load balancer is realized as a software load balancer.

Figure 23:
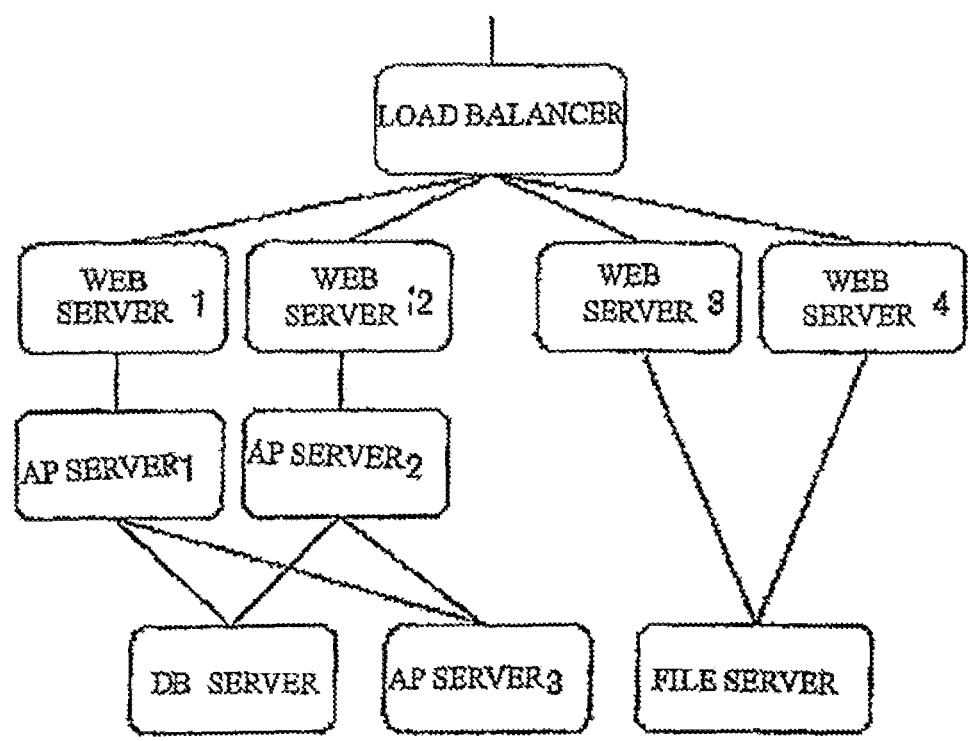
FIG. 23 is a diagram in which a subject system of the example of the invention is converted into a graph structure.
Figure 24:
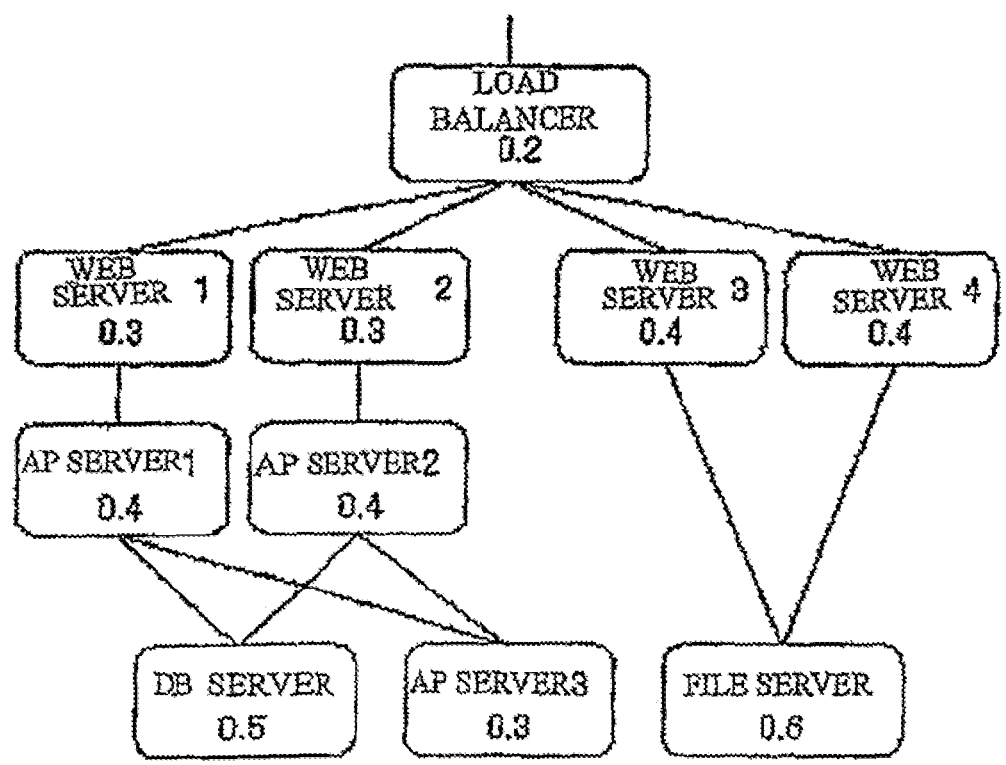
FIG. 24 is a diagram showing a graph structure in which a subject system of the example of the invention is point-weighted based on the server capacity information.

Next, the setting information and program of each server and the load balancer are analyzed to extract the dependency relationships between servers and applications. Suppose the configuration of FIG. 23 is obtained as the result of converting into a graph structure based on the dependency relationship information. Each server is represented as a point and the dependency relationship between servers is represented by an edge. Further, the graph is point-weighted based on the processing volume of each server. For example, the processing volume of each server is relatively evaluated based on the maximum CPU utilization value over the last one month. The point-weighted graph is shown in FIG. 24.

Here, a limitation is provided for contracting the graph. On the assumption that the virtual machine package is deployed to a single physical server, the size of the virtual machine package is limited to a certain volume. Specifically, the graph is contracted in such a way that the weight of each point of the contracted graph becomes 1.0 or less.

At first, an approach to divide the subject system into the minimum number of packages without respect to the dependency relationships. The problem can be formulated as a bin-packing problem in which each virtual machine is packed in a virtual machine package, and an approximate solution can be calculated by First-Fit Decrease algorithm of approximation algorithm.

Figure 25:
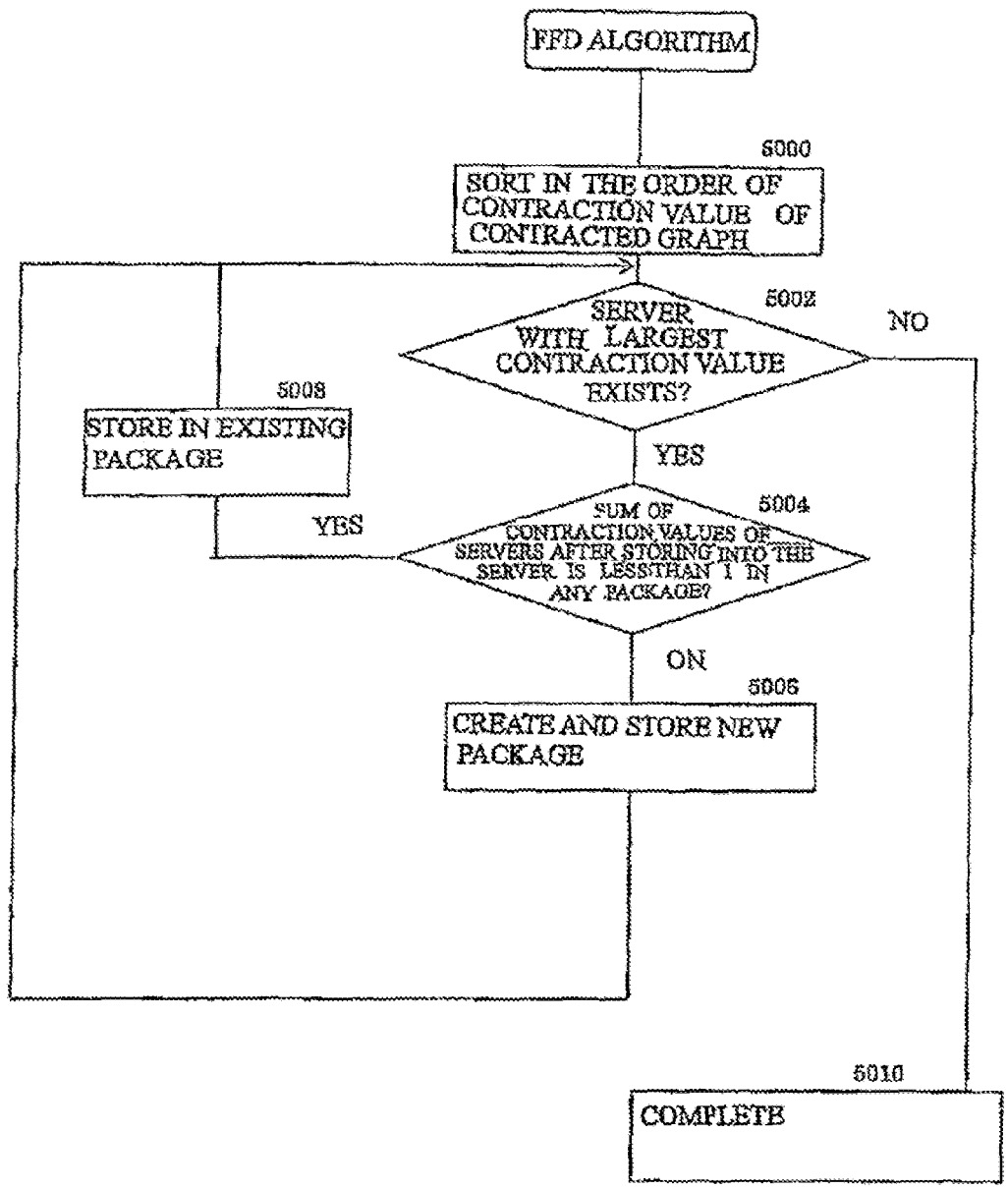
FIG. 25 is a flowchart in which a subject system of the example of the invention is point-weighted based on the server capacity information in accordance with FFD algorithm.

Here, FIG. 25 shows a flowchart that divides the subject system into the minimum number of packages without respect to dependency relationships using First-Fit Decrease algorithm.

First, as shown in FIG. 24, each device is weighted. In this case, the file server is set as 0.6; DB server, 0.5; AP server 2, 0.4; AP server 1, 0.4; Web server 3, 0.4; Web server 4, 0.4; AP server 3, 0.3; Web server 2, 0.3; Web server 1, 0.3; load balancer, 0.2. First, the virtual machine image generation function 12 sorts out these devices in the order of the weight value (contraction value) (5000).

Next, a device with the largest contraction value is determined (5002). If there is no device with the largest contraction value, there is no device to be divided, and the dividing process of the virtual package ends (5010). On the other hand, if there is a device with the largest contraction value, whether or not a virtual package that stores the device with the largest contraction value exists among the existing virtual packages is determined (5004). Here, the maximum contraction value for storing virtual package is set as 1.0. If a plurality of devices have been already stored in a virtual package and the value calculated by deducting the sum of the contracted values of the already stored devices from the maximum contraction value for storing virtual package, 1.0, is larger than the contraction value of the device with the largest contraction value among the presently existing contraction values, the virtual package is storable, and thus, the existing virtual package stores the device with the largest contraction value (5008). Then, the process goes to step 5002 again.

Figure 26:
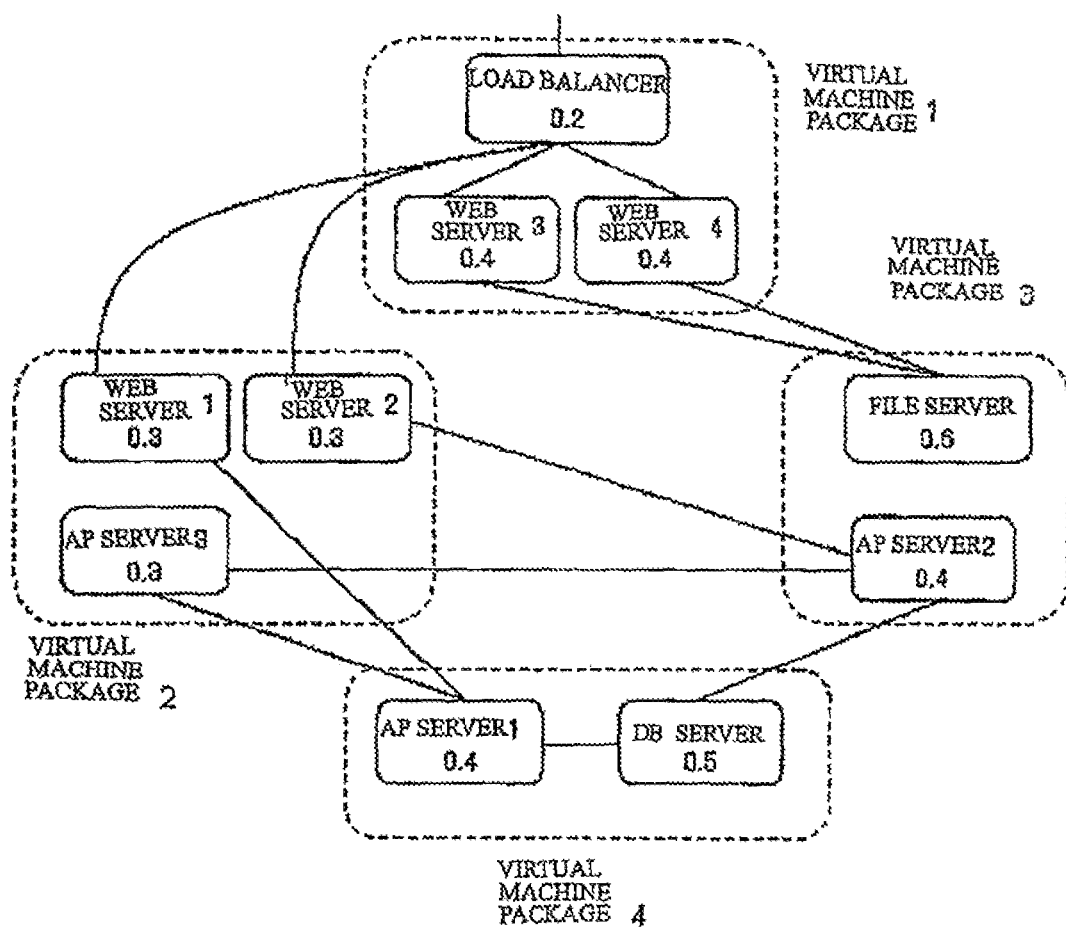
FIG. 26 is a diagram showing a configuration in which a graph representing a subject system of the example of the invention is contracted in accordance with fist Fit Decreasing algorithm.

On the other hand, if the value calculated by deducting the sum of the contracted values of the already stored devices from the maximum contraction value for storing virtual package, 1.0, is smaller than the contraction value of the device with the largest contraction value among the presently existing contraction values, a new virtual package is generated and the device with the largest contraction value among the presently existing contraction values is stored therein (5006). Also, if there is no virtual package generated, a new virtual package is generated and the device with the largest contraction value among the presently existing contraction values is stored therein. Then, the process goes to step 5002 again. As the result thereof, FIG. 26 shows the result of capturing virtual machine package candidates by applying First-Fit Decrease algorithm. The number of virtual machine packages becomes four, achieving the minimum value, while the dependency relationships between virtual machine packages, that is, the number of edges, become nine.

Figure 27:
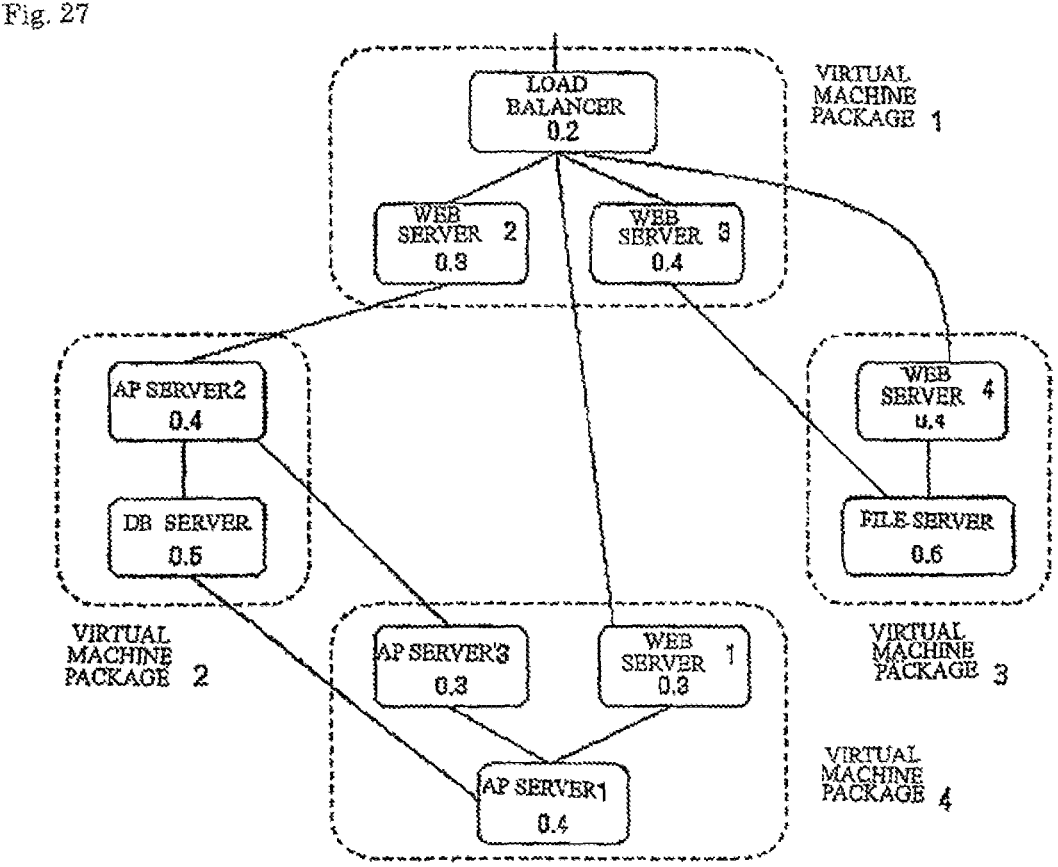
FIG. 27 is a diagram showing a resulting structure of a graph contraction conducted to a graph representing a subject system of the example of the invention in a way to decrease dependency relationships.

Next, an approach to divide the subject system by a graph contraction with respect to the dependency relationships is described. If an edge contraction is performed to the graph, the dependency relationships represented by edges are stored in a single point, thereby providing an advantage of decreasing the dependency relationships. Therefore, the more edge contractions are repeated within the limitation of the size of a virtual machine package, a contracted graph with a smaller number of dependency relationships can be generated. An example of a contracted graph obtained by an edge contraction is shown in FIG. 27. The number of virtual machine packages is four that is the minimum, while the number of the dependency relationships between virtual machine packages is six. Compared with the case where dependency relationships are disregarded, a virtual machine package with a smaller number of dependency relationships can be generated.

FIG. 28 shows virtual machine package setting files generated based on the contracted graph in FIG. 27.

The virtual machine image and virtual machine package setting files allow reproduction of a subject Web application system in other environment. In this case, since the number of the dependency relationships between virtual machine packages is small, setting tasks at the time of distributing the virtual machine package can be reduced. Also, since the virtual machine package is deployed to a single physical server, the number of the dependency relationships between the virtual machine packages is small, thereby reducing a network load between the physical servers.

Figure 29:
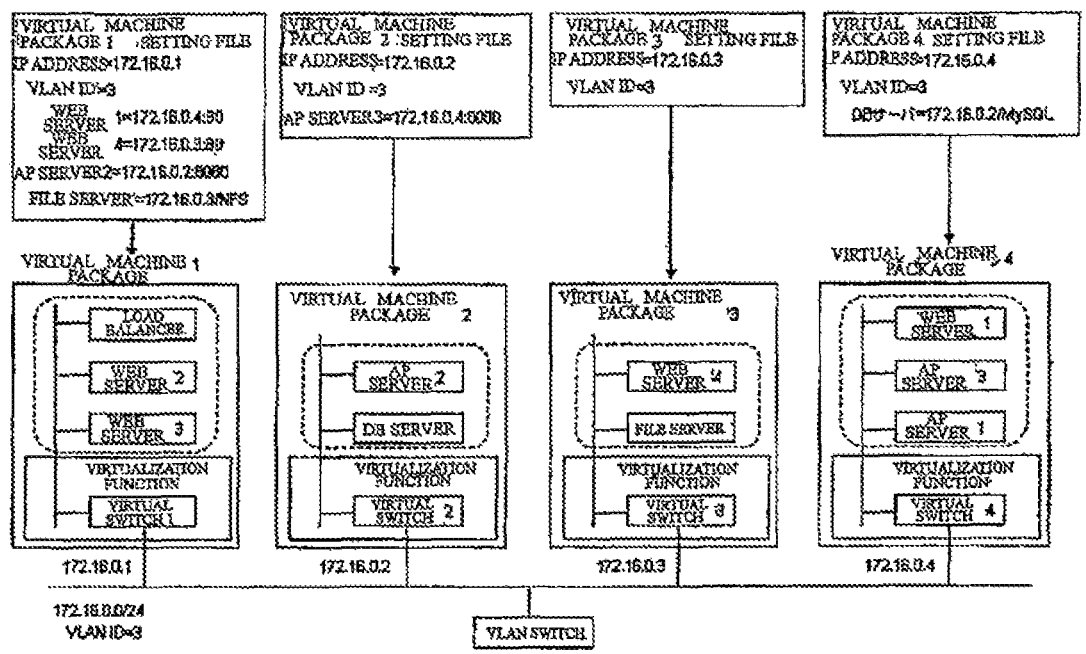
FIG. 29 is a diagram showing an illustrative example when distributing virtual machine packages generated in the example of the invention.

FIG. 29 shows configurations and setting files used when distributing the generated virtual machine packages to a network system of 172.16.0.0/24 and reproducing the virtual machine packages therein. IP addresses and VLAN IDs of the virtual machine packages are modified in accordance with the destination system. With the modification of the addresses, the setting relating to application communications is required to be modified. Communications within the virtual machine packages can be realized without changing the addresses using virtual switches provided by the virtualization function. On the virtual switch, NAT and VLAN ID are configured to be adapted to the destination system.

Example 2

Here, in example 1, the virtual package was divided in a condition in which the weight of each point of the contracted graph becomes 1.0 or less in an approach to divide a subject system with the minimum package number.

Figure 30:
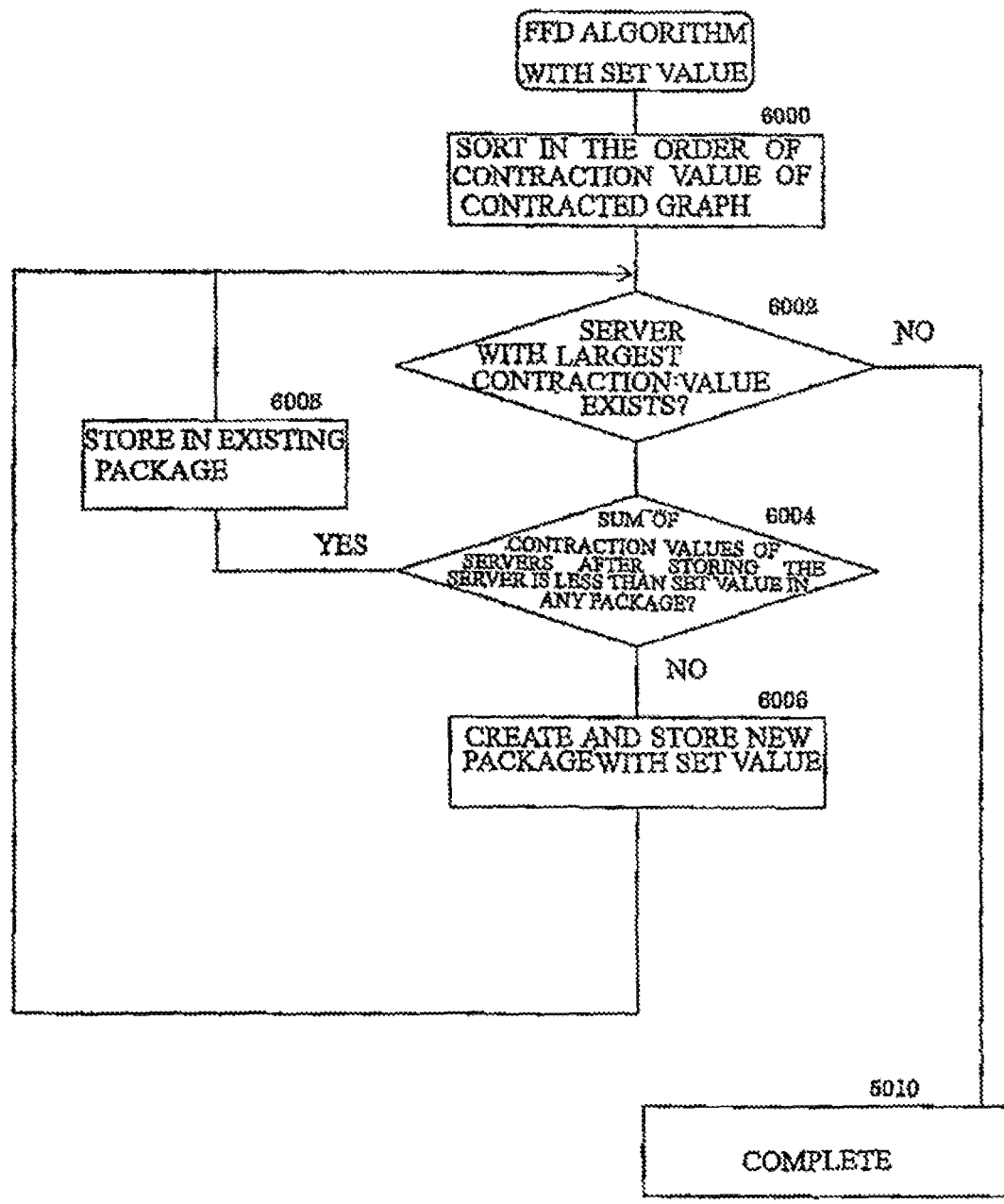
FIG. 30 is a diagram showing a graph structure in which subject systems of the second example of the invention is point-weighted based on the server capacity information.

However, depending on the physical environment in which a virtual package is extracted, the weight of each point of all contracted graph does not necessarily become 1.0 or less. Therefore, by limiting the weighting to a predetermined value or less, or by modifying the weighting for each generated virtual package, a virtual package adapted to the physical environment and server resources can be generated. FIG. 30 shows a flowchart in which a subject system is divided into virtual packages in a case in which the weighting is limited to a predetermined value or less.

Whether or not a device with the largest contracted value exists is judged (6002). If there is no device with the largest contracted value, there is no device to be divided, thus, the step for dividing the virtual package completes (6010). On the other hand, if there is a device with the largest contracted value, whether or not a virtual package to store the device with the largest contraction value exists among the presently existing virtual packages (6004). Here, the maximum contraction value for storing virtual package is set as A. If a plurality of devices have been already stored in a virtual package and if the value calculated by deducting the sum of the contracted values of the already stored devices from the maximum contraction value for storing virtual package, A, is larger than the contraction value of the device with the largest contraction value among the presently existing contraction values, the virtual package is storable, and thus, the existing virtual package stores the device with the largest contraction value among the presently existing contraction values (6008). Then, the process goes to step 6002 again.

On the other hand, if the value calculated by deducting the sum of the contracted values of the already stored devices from the maximum contraction value for storing virtual package, A, is smaller than the contraction value of the device with the largest contraction value among the presently existing contraction values, a new virtual package is generated and the device with the largest contraction value among the presently existing contraction values is stored therein (6006). Also, if there is no virtual package generated, a new virtual package is generated and the device with the largest contraction value among the presently existing contraction values is stored therein. Then, the process goes to step 6002 again. As the result thereof, the system can be divided into virtual machine packages with arbitrary weighting by applying First-Fit Decrease algorithm. The value of A may be a constant value for all packages or may vary for each package.

INDUSTRIAL APPLICABILITY

The invention can be applied to disaster recovery that reproduces a system damaged in a time of a large-scale disaster at another site. Also, when constructing a system, the invention can be used for a purpose to transfer a system constructed in a test environment to a real environment as is.

Further, after constructing a system, the invention can be applied to a purpose to construct another system in a new environment based on the system with which operation stability is confirmed.

The invention can be applied to a variety of subjects and the usability should not be limited in any way as long as the invention relates to a virtual machine package generation system, virtual machine package generation method, and virtual machine package generation program, and particularly, relates to a technique that is effective when applied to a virtual machine package generation system, virtual machine package generation method, and virtual machine package generation program that decrease dependency relationships between virtual machine packages when generating a plurality of virtual machine packages from an already constructed system to generate a virtual machine package with high reusability.

While the invention was described in relation to several preferred embodiments and examples, it should be understood that these embodiments and examples are only to describe the invention with illustrations, and not to limit the scope of the invention. After reading through this specification, it is apparent to those skilled in the art that a number of modifications and replacements with equivalent constituents and techniques are easily possible, while it is also apparent that such modifications and replacements fall within the true scope and spirit of the appended claims.

The invention claimed is:

1. A virtual machine package generation system comprising:
   a virtual machine image generation function for generating a virtual machine image of a subject computer system as a member of a networking computer system comprising a plurality of computers that emulates all the operations of the subject computer as an application code except for the operations solved in relation to other computer system by executing a program encoded to generate said virtual machine image on a central processing unit provided with the virtual machine package generation system;
   a virtual machine package setting file generation function for generating a setting file of a virtual machine package by analyzing dependency relationships between the subject computer system and other computer system in respect to the operations not solved by the subject computer system alone by executing a program encoded to generate said setting file of a virtual machine package on a central processing unit provided with the virtual machine package generation system; and
   a virtual machine package generation function for storing the virtual machine image and the virtual machine package setting file as the virtual machine package by executing a program encoded to store the virtual machine image and the virtual machine package setting file as the virtual machine package on a central processing unit provided with the virtual machine package generation system,
   wherein the virtual machine package setting file generation function includes:
      an analysis information collection unit for collecting a result of analyzing setting information and a program of the subject computer system;
      a graph structure conversion unit for converting dependency relationships between computer systems into a graph structure based on the result of analyzing;
      a contracted graph generation unit for generating a contracted graph by converting the graph structure;
      a virtual machine package setting file generation unit for determining virtual machine package candidates based on the contracted graph and writing out setting elements of the virtual machine package as the setting file;
      a server performance information storing unit for storing performance information of the subject computer system;
      a physical server limitation storing unit for storing performance information of a computer system to which a virtual machine package is distributed;
      a graph structure conversion unit for referring to the server performance information storing unit and point-weighting a graph; and
      a contracted graph generation unit for referring to the physical server limitation storing unit and generating a contracted graph by providing a limitation to a weight of a point of the contracted graph, wherein an optimal virtual machine package is obtained by minimizing the amount of dependency relationships between the subject computer and other computer system by reducing the redundant dependency relationships involved in the generated virtual machine setting file, and the optimal virtual machine package is stored in the virtual machine package generation system.

2. The virtual machine package generation system according to claim 1, wherein the virtual machine package setting file generation function includes:
   a network resource information storing unit for storing network resource information of a subject system; and
   a graph structure conversion unit for referring to the network resource information and edge-weighting a graph.

3. The virtual machine package generation system according to claim 2, wherein division of a virtual package is conducted with the contracted graph generation unit that generates the contracted graph using a constant value for the weight of the point of the contracted graph.

4. The virtual machine package generation system according to claim 2, wherein division of a virtual package is conducted with the contracted graph generation unit that generates the contracted graph by modifying the weight of the point of the contracted graph for each package.

5. The virtual machine package generation system according to claim 4, wherein division of a virtual package is conducted with the contracted graph generation unit that generates the contracted graph using a constant value for the weight of the point of the contracted graph.

6. The virtual machine package generation system according to claim 4, wherein division of a virtual package is conducted with the contracted graph generation unit that generates the contracted graph by modifying the weight of the point of the contracted graph for each package.

7. A virtual machine package generation method comprising:
   generating a virtual machine image of a subject computer system as a member of a networking computer system comprising a plurality of computers that emulates all the operations of the subject computer as an application code except for the operations solved in relation to other computer system by executing a program encoded to generate said virtual machine image on a central processing unit provided with the virtual machine package generation system;
   generating a setting file of a virtual machine package by analyzing dependency relationships between the subject computer system and other computer system in respect to the operations not solved by the subject computer system alone by executing a program encoded to generate said setting file of a virtual machine package on a central processing unit provided with the virtual machine package generation system; and
   storing the virtual machine image and a virtual machine package setting file as the virtual machine package by executing a program encoded to store the virtual machine image and the virtual machine package setting file as the virtual machine package on a central processing unit provided with the virtual machine package generation system,
   when generating the virtual machine package setting file, comprising:
   collecting a result of analyzing setting information and a program of a subject computer system;
   converting dependency relationships between the subject computer system and other computer system into a graph structure based on the result of analyzing;
   extracting virtual machine package candidates by contracting a graph;
   writing out dependency relationships between virtual machine packages as the setting file;
   referring to performance information of the subject computer system;
   generating the graph structure by point-weighting the graph;
   referring to the performance information of the computer system to which the virtual machine package is distributed; and
   generating a contracted graph by providing a limitation to a weight of a point of the contracted graph to extract virtual machine package candidates in which each computer system provides the sufficient performance required by the assigned virtual machine,
   wherein an optimal virtual machine package is obtained by minimizing the amount of dependency relationships between the subject computer and other computer system by reducing the redundant dependency relationships involved in the generated virtual machine setting file, and the optimal virtual machine package is stored in the virtual machine package generation system.

8. The virtual machine package generation method according to claim 7, wherein the virtual machine package setting file generating method further comprising:
   referring to a network resource information storing unit that stores network resource information of a subject system; and
   generating the graph structure by point-weighting the graph.

9. The virtual machine package generation method according to claim 8, wherein division of a virtual package is conducted with the contracted graph generation unit that generates the contracted graph using a constant value for the weight of the point of the contracted graph.

10. The virtual machine package generation method according to claim 8, wherein division of a virtual package is conducted with the contracted graph generation unit that generates the contracted graph by modifying the weight of the point of the contracted graph for each package.

11. The virtual machine package generation method according to claim 7, wherein division of a virtual package is conducted with the contracted graph generation unit that generates the contracted graph using a constant value for the weight of the point of the contracted graph.

12. The virtual machine package generation method according to claim 7, wherein division of a virtual package is conducted with the contracted graph generation unit that generates the contracted graph by modifying the weight of the point of the contracted graph for each package.

13. A computer program product stored in a non-transitory computer-readable medium, for causing a computer to execute steps of:
   generating a virtual machine image of a subject computer system as a member of a networking computer system comprising a plurality of computers that emulates all the operations of the subject computer as an application code except for the operations solved in relation to other computer system;
   generating a setting file of a virtual machine package by analyzing dependency relationships between the subject computer system and other computer system in respect to the operations not solved by the subject computer system alone; and
   storing the virtual machine image and a virtual machine package setting file as the virtual machine package,
   when generating the virtual machine package setting file for causing the computer to execute steps of:
   collecting a result of analyzing setting information and a program of a subject computer system;
   converting dependency relationships between the subject computer system and other computer system into a graph structure based on the result of analyzing;
   extracting virtual machine package candidates by contracting a graph; and
   writing out dependency relationships between virtual machine packages as the setting file;
   referring to performance information of the subject computer system;
   generating the graph structure by point-weighting the graph;
   referring to the performance information of the computer system to which the virtual machine package is distributed;
   generating a contracted graph by providing a limitation to a weight of a point of the contracted graph to extract virtual machine package candidates in which each computer system provides the sufficient performance required by the assigned virtual machine; and
   wherein an optimal virtual machine package is obtained by minimizing the amount of dependency relationships between the subject computer and other computer system by reducing the redundant dependency relationships involved in the generated virtual machine setting file, and the optimal virtual machine package is stored in the virtual machine package generation system.

14. The virtual machine package generation program product according to claim 13, when generating a virtual machine package setting file, for further causing a computer to run processes of:
   referring to a network resource information storing unit that stores network resource information of a subject system; and
   generating a graph structure by point-weighting a graph.

15. The virtual machine package generation program product according to claim 14, wherein division of a virtual package is conducted with the contracted graph generation unit that generates the contracted graph using a constant value for the weight of the point of the contracted graph.

16. The virtual machine package generation program product according to claim 14, wherein division of a virtual package is conducted with the contracted graph generation unit that generates the contracted graph by modifying the weight of the point of the contracted graph for each package.

17. The virtual machine package generation program product according to claim 13, wherein division of a virtual package is conducted with the contracted graph generation unit that generates the contracted graph using a constant value for the weight of the point of the contracted graph.

18. The virtual machine package generation program product according to claim 13, wherein division of a virtual package is conducted with the contracted graph generation unit that generates the contracted graph by modifying the weight of the point of the contracted graph for each package.

* * * * *